United States Patent
Kim et al.

(10) Patent No.: US 12,487,705 B2
(45) Date of Patent: Dec. 2, 2025

(54) DISPLAY DEVICE AND INSPECTING METHOD THEREOF

(71) Applicant: SAMSUNG DISPLAY CO., LTD., Yongin-si (KR)

(72) Inventors: Soo Won Kim, Yongin-si (KR); Il Ho Lee, Yongin-si (KR); Wan Kee Jun, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/828,636

(22) Filed: Sep. 9, 2024

(65) Prior Publication Data

US 2025/0147625 A1 May 8, 2025

(30) Foreign Application Priority Data

Nov. 8, 2023 (KR) ........................ 10-2023-0153805

(51) Int. Cl.
*G06F 3/041* (2006.01)
*G06F 3/044* (2006.01)

(52) U.S. Cl.
CPC .......... *G06F 3/0418* (2013.01); *G06F 3/0446* (2019.05)

(58) Field of Classification Search
CPC ......... G06F 3/041–0488; G06F 3/0418; G06F 3/0446
See application file for complete search history.

(56) References Cited

U.S. PATENT DOCUMENTS

| | | | | |
|---|---|---|---|---|
| 8,091,189 B2* | 1/2012 | Kawashima | ............. | H03H 3/02 73/862.59 |
| 9,041,636 B2* | 5/2015 | Fujioka | ............... | G02F 1/13338 345/173 |
| 9,170,689 B2* | 10/2015 | Nakamura | ............ | G06F 3/0446 |
| 9,377,906 B2 | 6/2016 | Lee et al. | | |
| 2008/0157893 A1* | 7/2008 | Krah | ...................... | G06F 3/0418 345/174 |
| 2010/0214035 A1* | 8/2010 | Terada | ................... | H03B 5/368 331/167 |
| 2010/0253647 A1* | 10/2010 | Agari | ..................... | G06F 3/0446 345/174 |
| 2013/0093721 A1* | 4/2013 | Nakamura | ............ | G06F 3/0445 345/174 |
| 2013/0169601 A1* | 7/2013 | Mo | ........................ | G06F 3/0383 345/179 |
| 2014/0176498 A1* | 6/2014 | Yanase | .................. | G06F 3/0418 345/174 |
| 2015/0346889 A1* | 12/2015 | Chen | ................... | G06F 3/04166 345/174 |

(Continued)

FOREIGN PATENT DOCUMENTS

KR 10-1330320 B1 11/2013
KR 10-2022-0081402 A 6/2022

*Primary Examiner* — Amy Onyekaba
(74) *Attorney, Agent, or Firm* — F.CHAU & ASSOCIATES, LLC

(57) ABSTRACT

A display device includes a touch sensor including a touch panel and a touch controller, and a crystal unit connected to the touch controller. The touch controller includes a plurality of sensing channels connected to the touch panel, and a feedback circuit. The crystal unit is connected to at least one of the sensing channels in a first mode, and is connected to the feedback circuit in a second mode.

20 Claims, 14 Drawing Sheets

(56) References Cited

U.S. PATENT DOCUMENTS

| | | | |
|---|---|---|---|
| 2016/0085375 A1* | 3/2016 | Park | G06F 3/0418 |
| | | | 345/174 |
| 2016/0209944 A1* | 7/2016 | Shim | G06F 3/04166 |
| 2016/0302668 A1* | 10/2016 | Yang | G01K 7/32 |
| 2019/0190447 A1* | 6/2019 | Kraus | H03B 5/06 |
| 2019/0305727 A1* | 10/2019 | Oomori | H03B 5/364 |
| 2020/0235702 A1* | 7/2020 | Kumar | H03B 5/06 |
| 2021/0034214 A1* | 2/2021 | Gray | G06F 3/04166 |
| 2021/0048934 A1* | 2/2021 | Van Ostrand | G06F 3/03545 |
| 2022/0004303 A1* | 1/2022 | Kakinoki | G06F 3/0443 |

\* cited by examiner

<MODE2>

<MODE1>

DISPLAY DEVICE AND INSPECTING METHOD THEREOF

CROSS-REFERENCE TO RELATED APPLICATION(S)

This application claims priority under 35 U.S.C. § 119 to Korean Patent Application No. 10-2023-0153805, filed on Nov. 8, 2023 in the Korean Intellectual Property Office, the disclosure of which is incorporated by reference herein in its entirety.

TECHNICAL FIELD

Embodiments of the present disclosure relate to a display device and an inspecting method of the display device.

DISCUSSION OF RELATED ART

As advancements are made in information technology, the importance of a display device, which is a connection medium between a user and information, has been increasing.

SUMMARY

Embodiments of the present disclosure provide a display device and an inspecting method of the display device, which can accurately inspect a cause of a defect in a crystal unit.

According to an embodiment of the present disclosure, a display device includes a touch sensor including a touch panel and a touch controller, and a crystal unit connected to the touch controller. The touch controller includes a plurality of sensing channels connected to the touch panel, and a feedback circuit. The crystal unit is connected to at least one of the sensing channels in a first mode, and is connected to the feedback circuit in a second mode.

In an embodiment, the crystal unit includes a crystal oscillator disposed between a first terminal and a second terminal, a first external capacitor disposed between the first terminal and a ground power supply, and a second external capacitor disposed between the second terminal and the ground power supply.

In an embodiment, in the first mode, the at least one sensing channel measures at least one of a capacitance of the first external capacitor and a capacitance of the second external capacitor.

In an embodiment, the first terminal is connected to one of the sensing channels, and the one of the sensing channels measures the capacitance of the first external capacitor.

In an embodiment, the second terminal is connected to one of the sensing channels, and the one of the sensing channels measures the capacitance of the second external capacitor.

In an embodiment, the first terminal is connected to a first sensing channel among the sensing channels and the second terminal is connected to a second sensing channel different from the first sensing channel among the sensing channels, and the first sensing channel measures the capacitance of the first external capacitor and the second sensing channel measures the capacitance of the second external capacitor.

In an embodiment, each of the sensing channels includes an amplifier and a feedback capacitor connected in parallel with the amplifier.

In an embodiment, the touch controller includes an inspection unit that inspects whether the capacitance of the first external capacitor and the capacitance of the second external capacitor are normal values.

In an embodiment, when the capacitance of the first external capacitor and the capacitance of the second external capacitor are the normal values, the first mode is switched to the second mode.

In an embodiment, in the second mode, the feedback circuit outputs an oscillation frequency of the crystal oscillator.

In an embodiment, the feedback circuit includes an inverter and a feedback resistor connected in parallel with the inverter.

In an embodiment, the touch panel includes a plurality of sensor electrodes that sense a touch input using a self-capacitive method.

According to an embodiment of the present disclosure, a method of inspecting a display device that includes a touch sensor including a touch panel and a touch controller and a crystal unit includes connecting the crystal unit to at least one of a plurality of sensing channels of the touch controller, measuring an external capacitance of the crystal unit, and inspecting whether the external capacitance is a normal value.

In an embodiment, the crystal unit includes a crystal oscillator disposed between a first terminal and a second terminal, a first external capacitor disposed between the first terminal and a ground power supply, and a second external capacitor disposed between the second terminal and the ground power supply.

In an embodiment, connecting the crystal unit to the at least one of the sensing channels includes connecting the first terminal to the at least one of the sensing channels, and measuring the external capacitance of the crystal unit includes measuring a capacitance of the first external capacitor.

In an embodiment, connecting the crystal unit to the at least one of the sensing channels includes connecting the second terminal to the at least one of the sensing channels, and measuring the external capacitance of the crystal unit includes measuring a capacitance of the second external capacitor.

In an embodiment, connecting the crystal unit to the at least one of the sensing channels includes connecting the first terminal to a first sensing channel among the sensing channels and the second terminal to a second sensing channel different from the first sensing channel among the sensing channels, and measuring the external capacitance of the crystal unit includes measuring a capacitance of the first external capacitor and a capacitance of the second external capacitor.

In an embodiment, the method of inspecting the display device further includes connecting the crystal unit to a feedback circuit of the touch controller when the external capacitance is the normal value.

In an embodiment, each of the sensing channels includes an amplifier and a feedback capacitor connected in parallel with the amplifier.

In an embodiment, the feedback circuit includes an inverter and a feedback resistor connected in parallel with the inverter.

BRIEF DESCRIPTION OF THE DRAWINGS

The above and other features of the present disclosure will become more apparent by describing in detail embodiments thereof with reference to the accompanying drawings.

DETAILED DESCRIPTION OF THE ILLUSTRATED EMBODIMENTS

Figure 1:
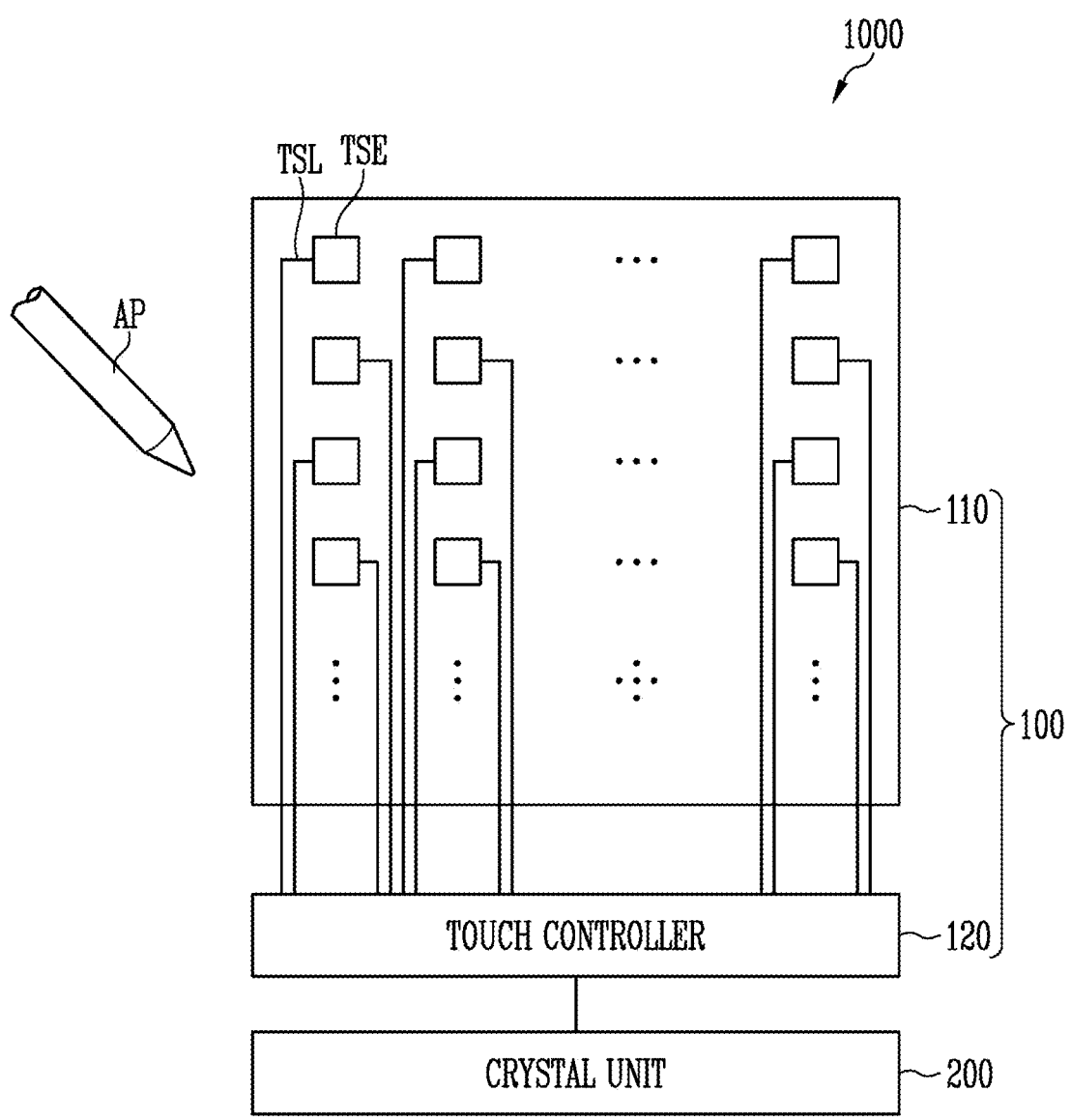
FIG. 1 illustrates a display device according to an embodiment of the present disclosure.

Embodiments of the present disclosure will be described more fully hereinafter with reference to the accompanying drawings. Like reference numerals may refer to like elements throughout the accompanying drawings.

It will be understood that the terms "first," "second," "third," etc. are used herein to distinguish one element from another, and the elements are not limited by these terms. Thus, a "first" element in an embodiment may be described as a "second" element in another embodiment.

Herein, when two or more processes or events are described as being performed at or occurring at substantially the same time or simultaneously, it is to be understood that the processes or events may be performed at or may occur at exactly the same time, or at about the same time as would be understood by a person having ordinary skill in the art. For example, the processes or events may be performed at or may occur at about the same time within a measurement error as would be understood by a person having ordinary skill in the art.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." As used herein, the word "or" means logical "or" so that, unless the context indicates otherwise, the expression "A, B, or C" means "A and B and C," "A and B but not C," "A and C but not B," "B and C but not A," "A but not B and not C," "B but not A and not C," and "C but not A and not B."

It will be further understood that the terms "comprises," "comprising," "includes," and "including", when used in this specification, specify the presence of stated features, integers, steps, operations, elements, or components, but do not preclude the presence or addition of one or more other features, integers, steps, operations, elements, components, or groups thereof.

It will be understood that when a component such as a film, a region, a layer, etc., is referred to as being "on", "connected to", "coupled to", or "adjacent to" another component, it can be directly on, connected, coupled, or adjacent to the other component, or intervening components may be present. It will also be understood that when a component is referred to as being "between" two components, it can be the only component between the two components, or one or more intervening components may also be present. It will also be understood that when a component is referred to as "covering" another component, it can be the only component covering the other component, or one or more intervening components may also be covering the other component. Other words used to describe the relationships between components should be interpreted in a like fashion.

FIG. 1 illustrates a display device according to an embodiment of the present disclosure.

Referring to FIG. 1, a display device 1000 may include a touch sensor 100 and a crystal unit 200. The crystal unit 200 may also be referred to as a crystal circuit or a crystal oscillator. The touch sensor 100 may include a touch panel 110 and a touch controller 120. The touch controller 120 may also be referred to as a touch controller circuit.

The touch panel 110 may include a plurality of touch electrodes TSE that sense touch input using a self-capacitance method. Each of the touch electrodes TSE may have a self-capacitance with respect to a reference potential, for example, a ground potential. The touch electrodes TSE may be dispersed and disposed in a touch area of the touch panel 110. For example, the touch electrodes TSE may be distributed in a matrix form at positions corresponding to coordinates (for example, two-dimensional coordinates) defined in the touch area at a predetermined density or resolution.

A plurality of touch wires TSL may be connected to the touch electrodes TSE. The touch electrodes TSE may be connected to the touch controller 120 through the touch wires TSL. Driving signals may be applied to the touch electrodes TSE through the touch wires TSL. In addition, a change in capacitance generated in the touch electrodes TSE may be sensed through the touch wires TSL.

However, the present disclosure is not limited to the above-described embodiment. For example, according to an embodiment, the touch panel 110 may be formed in a structure for sensing a touch input in a mutual capacitance method.

The touch controller 120 may be electrically connected to the touch panel 110. For example, the touch controller 120 may be connected to the touch electrodes TSE through the touch wires TSL. The touch controller 120 may sense a touch input generated on the touch panel 110. For example, when the touch controller 120 applies a driving signal to the touch electrodes TSE, each of the touch electrodes TSE may form a predetermined capacitance. In this case, when a touch input, for example, a user's touch, occurs on the touch electrodes TSE, additional capacitance may be generated between the touch electrodes TSE and the user, so that the capacitance of the touch electrodes TSE may be changed. The touch controller 120 may sense whether a touch input occurs, a touch position, and the like through a change in capacitance formed in each of the touch electrodes TSE.

An active pen AP is an input device that generates pen signals on its own. The touch controller 120 may receive a pen signal to sense a position where the active pen AP is touched on the touch panel 110. For example, the active pen AP may output a pen signal in synchronization with a driving signal of the touch controller 120.

The crystal unit 200 may be connected to the touch controller 120. The crystal unit 200 may provide a predetermined frequency signal to the touch controller 120. The predetermined frequency signal may be set to a frequency suitable for sensing the touch position of the active pen AP. The touch controller 120 may generate a driving signal used to sense the touch position of the active pen AP based on a predetermined frequency signal provided from the crystal unit 200.

The crystal unit 200 may constantly provide a predetermined frequency signal to the touch controller 120. However, when a defect occurs in the crystal unit 200, the predetermined frequency may be changed. In this case, it may be difficult to determine whether the defect of the crystal unit 200 is due to a first external capacitor Ce1 and/or a second external capacitor Ce2, or due to a crystal oscillator X-TAL (see FIG. 5). The crystal oscillator X-TAL may also be referred to as a crystal oscillator circuit.

Figure 2:
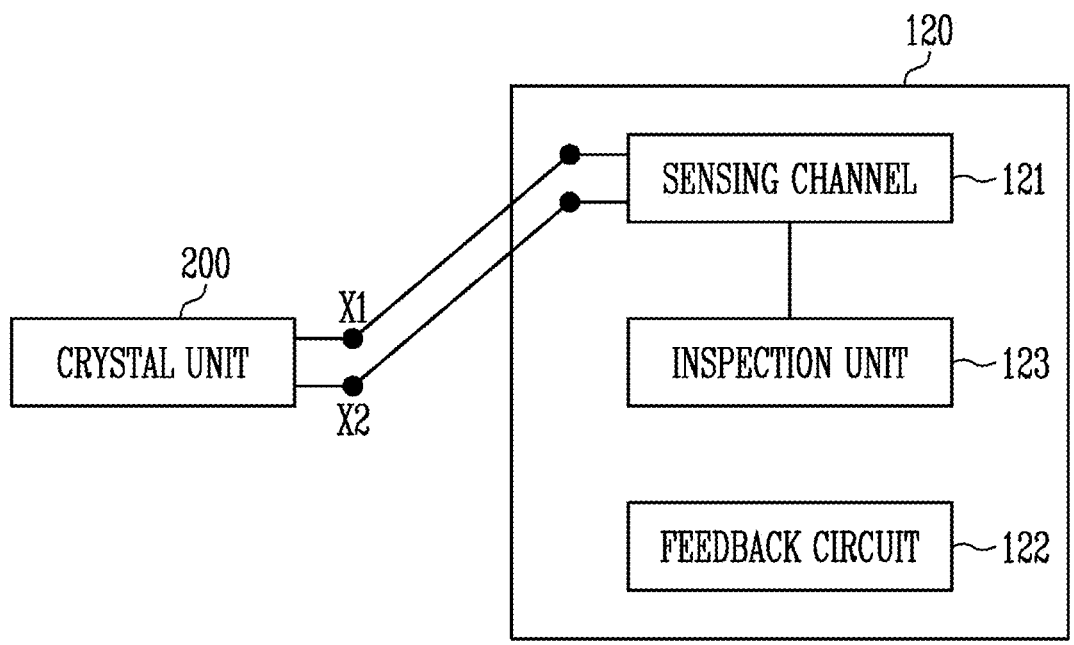
FIG. 2 illustrates a connection structure in a first mode according to an embodiment of the present disclosure.
Figure 3:
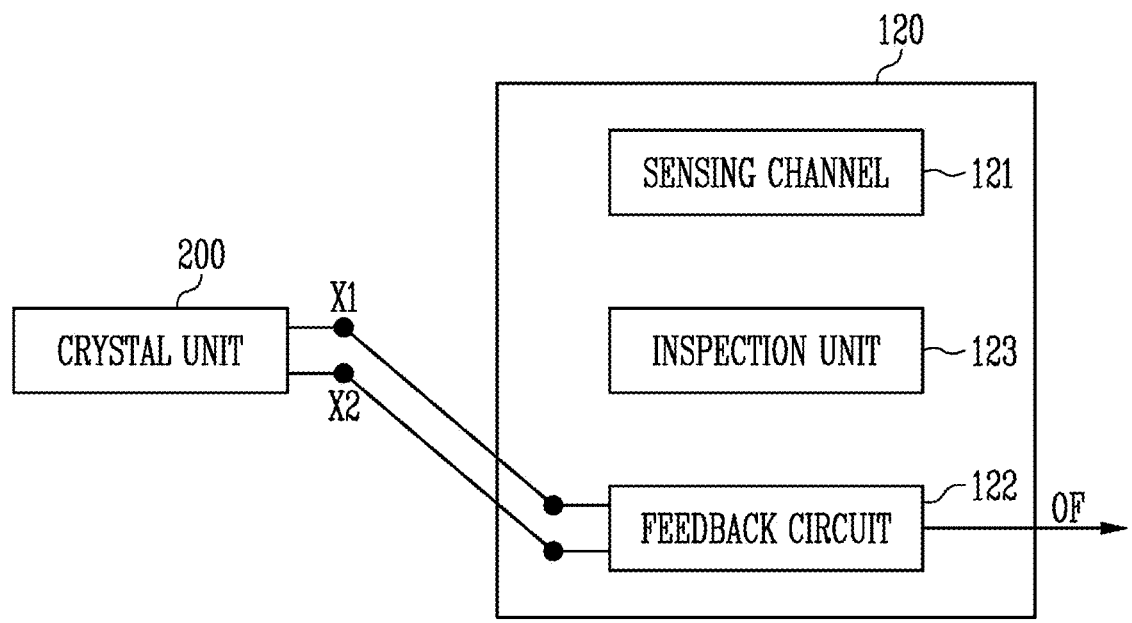
FIG. 3 illustrates a connection structure in a second mode according to an embodiment of the present disclosure.

FIG. 2 illustrates a connection structure in a first mode according to an embodiment of the present disclosure. FIG. 3 illustrates a connection structure in a second mode according to an embodiment of the present disclosure.

Referring to FIGS. 2 and 3, the crystal unit 200 may include a first terminal X1 and a second terminal X2. The crystal unit 200 may be connected to the touch controller 120 through the first terminal X1 and the second terminal X2. The connection structure of the crystal unit 200 may be different in a first mode MODE1 and a second mode MODE2.

The touch controller 120 may include at least one sensing channel 121, a feedback circuit 122, and an inspection unit 123. The inspection unit 123 may also be referred to as an inspection circuit.

Referring to FIG. 2, the first mode MODE1 may be a mode in which the crystal unit 200 is inspected to determine whether the crystal unit 200 is defective. For example, in the first mode MODE1, an inspection may be performed to determine whether the first external capacitor Ce1 and/or the second external capacitor Ce2 are defective (see FIG. 5).

In the first mode MODE1, the first terminal X1 and the second terminal X2 of the crystal unit 200 may be connected to at least one sensing channel 121. The at least one sensing channel 121 may measure at least one of a capacitance of the first external capacitor Ce1 and a capacitance of the second external capacitor Ce2. The capacitance of the first external capacitor Ce1 and/or the capacitance of the second external capacitor Ce2 measured in the at least one sensing channel 121 may be provided to the inspection unit 123. The specific structure of the at least one sensing channel 121 will be described in further detail below with reference to FIG. 4.

The inspection unit 123 may be connected to the at least one sensing channel 121. In the first mode MODE1, the inspection unit 123 may detect whether the first external capacitor Ce1 and the second external capacitor Ce2 are defective based on the capacitance of the first external capacitor Ce1 and the capacitance of the second external capacitor Ce2 provided from the at least one sensing channel 121.

Figure 5:
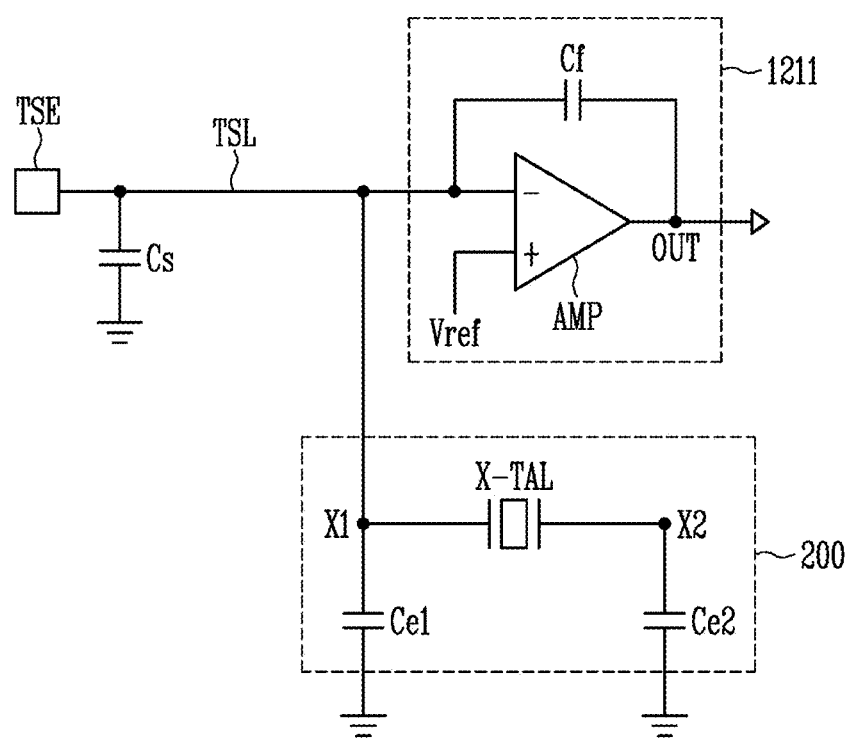
FIG. 5 illustrates a connection structure of a crystal unit in a first mode according to an embodiment of the present disclosure.

For example, the inspection unit 123 may detect whether the first external capacitor Ce1 and the second external capacitor Ce2 are defective through the load capacitance of the crystal oscillator X-TAL (see FIG. 5). The load capacitance refers to a capacitance value at which the crystal oscillator X-TAL may normally oscillate, and may be specified when manufacturing the crystal oscillator X-TAL. The load capacitance is mathematically the capacitance of the crystal unit 200 viewed from the first terminal X1 and the second terminal X2, and may be expressed as Equation 1 below.

$$C_L = C1 * C2/(C1 + C2) + Cs \qquad \text{[Equation 1]}$$

Here, $C_L$ is a load capacitance, C1 is a capacitance of the first external capacitor Ce1, C2 is a capacitance of the second external capacitor Ce2, and Cs is a stray capacitance. The stray capacitance means a sum of a parasitic capacitance of the first terminal X1 and the second terminal X2 and a capacitance generated from a printed circuit board (PCB), and the sum may be previously known through measurement.

When the capacitance of the first external capacitor Ce1 and the capacitance of the second external capacitor Ce2 do not satisfy the load capacitance, the inspection unit 123 may determine that a defect has occurred in the first external capacitor Ce1 and the second external capacitor Ce2.

In contrast, when the capacitance of the first external capacitor Ce1 and the capacitance of the second external capacitor Ce2 satisfy the load capacitance, the inspection unit 123 may determine that the first external capacitor Ce1 and the second external capacitor Ce2 are normal. In this case, the first mode MODE1 may be terminated and the crystal unit 200 may switch to operating in the second mode MODE2.

For example, the inspection unit 123 may detect whether the first external capacitor Ce1 and the second external capacitor Ce2 are defective through negative resistance of the crystal oscillator X-TAL. The negative resistance is a conceptual term and may be expressed as Equation 2 below.

$$-R = -g_m/(w^2 * C1 * C2) \qquad \text{[Equation 2]}$$

Here, —R is a negative resistance, C1 is a capacitance of the first external capacitor Ce1, C2 is a capacitance of the second external capacitor Ce2, and w is an oscillation frequency of the crystal oscillator X-TAL. In addition, $g_m$ refers to a transconductance value of an inverter INV (see FIG. 8) applied to the feedback circuit 122, and the value may be previously known through measurement.

The inspection unit 123 may compare the negative resistance with the equivalent series resistance (ESR) of the crystal oscillator X-TAL (see Equation 3 below) to detect whether the first external capacitor Ce1 and the second external capacitor Ce2 are defective.

$$-R \geq 5 * ESR \qquad \text{[Equation 3]}$$

The equivalent series resistance (ESR) refers to the resistance of the crystal oscillator X-TAL at the series resonance frequency.

When the value of the negative resistance derived from the capacitance of the first external capacitor Ce1 and the capacitance of the second external capacitor Ce2 is less than about five times the value of the equivalent series resistance (ESR), the inspection unit 123 may determine that a defect has occurred in the first external capacitor Ce1 and the second external capacitor Ce2.

In contrast, when the value of the negative resistance derived from the capacitance of the first external capacitor Ce1 and the capacitance of the second external capacitor Ce2 is more than about five times the value of the equivalent series resistance (ESR) of the crystal oscillator X-TAL, the inspection unit 123 may determine that the first external capacitor Ce1 and the second external capacitor Ce2 are normal. In this case, the first mode MODE1 may be terminated and the crystal unit 200 may switch to operating in the second mode MODE2.

In some embodiments, when the capacitance of the first external capacitor Ce1 and the capacitance of the second external capacitor Ce2 satisfy both the load capacitance and the negative resistance, the inspection unit 123 may determine that the first external capacitor Ce1 and the second external capacitor Ce2 are normal. In this case, the first mode MODE1 may be terminated and the crystal unit 200 may switch to operating in the second mode MODE2.

Referring to FIG. 3, the second mode MODE2 may be an oscillation mode in which an oscillation frequency OF is output. For example, a frequency signal generated by the crystal unit 200 may be modulated through the feedback circuit 122 to output the oscillation frequency OF.

In the second mode MODE2, the first terminal X1 and the second terminal X2 of the crystal unit 200 may be connected to the feedback circuit 122. The feedback circuit 122 may amplify and output the frequency signal generated by the crystal unit 200. Accordingly, the feedback circuit 122 may output the oscillation frequency OF of the crystal oscillator X-TAL. The oscillation frequency OF output by the feedback circuit 122 may be used to sense the touch position of the active pen AP (refer to FIG. 1). The specific structure of the feedback circuit 122 will be described in further detail below with reference to FIG. 8.

Figure 4:
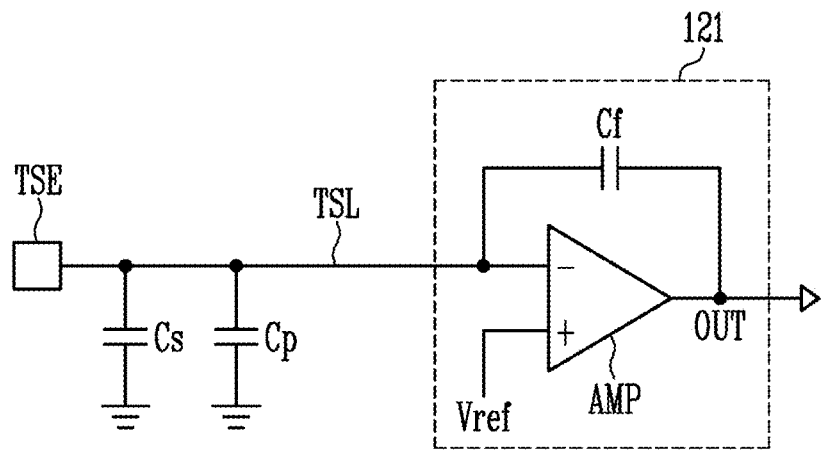
FIG. 4 illustrates a sensing channel according to an embodiment of the present disclosure.

FIG. 4 illustrates a sensing channel according to an embodiment of the present disclosure. For convenience of explanation, FIG. 4 only illustrates one touch electrode TSE and one sensing channel 121 connected thereto.

Referring to FIG. 4, the touch electrode TSE may have a self-capacitance Cs with respect to a ground potential. The touch electrode TSE may be connected to the sensing channel 121 through the touch wire TSL.

The sensing channel 121 may include an amplifier AMP and a feedback capacitor Cf connected in parallel with the amplifier AMP.

A first input terminal (−) of the amplifier AMP may be connected to the touch wire TSL. A change in capacitance generated at the touch electrode TSE may be input to the first input terminal (−) of the amplifier AMP. For example, the changed capacitance of the touch electrode TSE due to the generation of an additional capacitance Cp according to the user's touch may be input to the first input terminal (−) of the amplifier AMP.

A second input terminal (+) of the amplifier AMP may be connected to a reference power supply Vref. The reference power supply Vref may have a potential suitable for sensing the changed capacitance of the touch electrode TSE, for example, a ground potential.

The feedback capacitor Cf may be connected between the first input terminal (−) and an output terminal OUT of the amplifier AMP. The feedback capacitor Cf may generate a potential difference between the output terminal OUT and the first input terminal (−) of the amplifier AMP, and the feedback capacitor Cf may store charges.

The amplifier AMP may operate as a comparator. That is, the amplifier AMP may output a signal corresponding to a voltage difference between the first input terminal (−) and the second input terminal (+). The signal output from the amplifier AMP may be transmitted to a processor. The processor may detect a touch input based on the signal output from the sensing channel 121.

FIG. 5 illustrates a connection structure of a crystal unit in a first mode according to an embodiment of the present disclosure. For convenience of explanation, FIG. 5 only illustrates one touch electrode TSE and one sensing channel 1211 connected thereto.

Referring to FIG. 5, in the first mode MODE1, the first terminal X1 of the crystal unit 200 may be connected to one sensing channel 1211 of the sensing channels 121 (see FIG. 2). For example, the first terminal X1 of the crystal unit 200 may be connected to the first input terminal (−) of the sensing channel 1211. The capacitance of the first external capacitor Ce1 of the crystal unit 200 may be measured through the sensing channel 1211. That is, in some embodiments, the capacitance of the first external capacitor Ce1 of the crystal unit 200 may be selectively measured.

Figure 6:
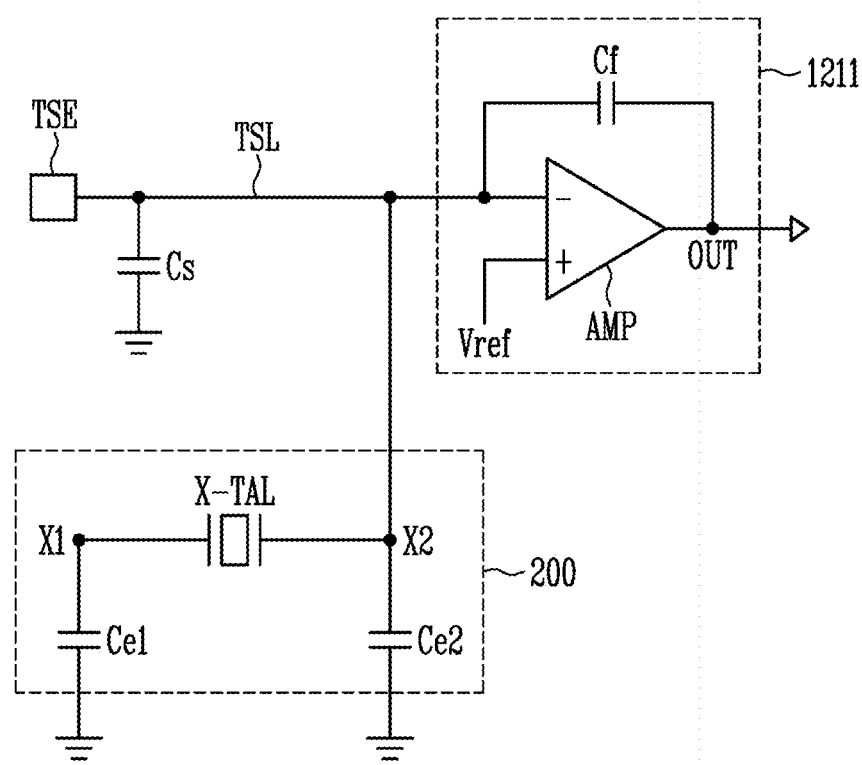
FIG. 6 illustrates a connection structure of a crystal unit in a first mode according to an embodiment of the present disclosure.

FIG. 6 illustrates a connection structure of a crystal unit in a first mode according to an embodiment of the present disclosure. For convenience of explanation, FIG. 6 only illustrates one touch electrode TSE and one sensing channel 1211 connected thereto.

Referring to FIG. 6, in the first mode MODE1, the second terminal X2 of the crystal unit 200 may be connected to one sensing channel 1211 of the sensing channels 121 (see FIG. 2). For example, the second terminal X2 of the crystal unit 200 may be connected to the first input terminal (−) of the sensing channel 1211. The capacitance of the second external capacitor Ce2 of the crystal unit 200 may be measured through the sensing channel 1211. That is, in some embodiments, the capacitance of the second external capacitor Ce2 of the crystal unit 200 may be selectively measured.

Figure 7:
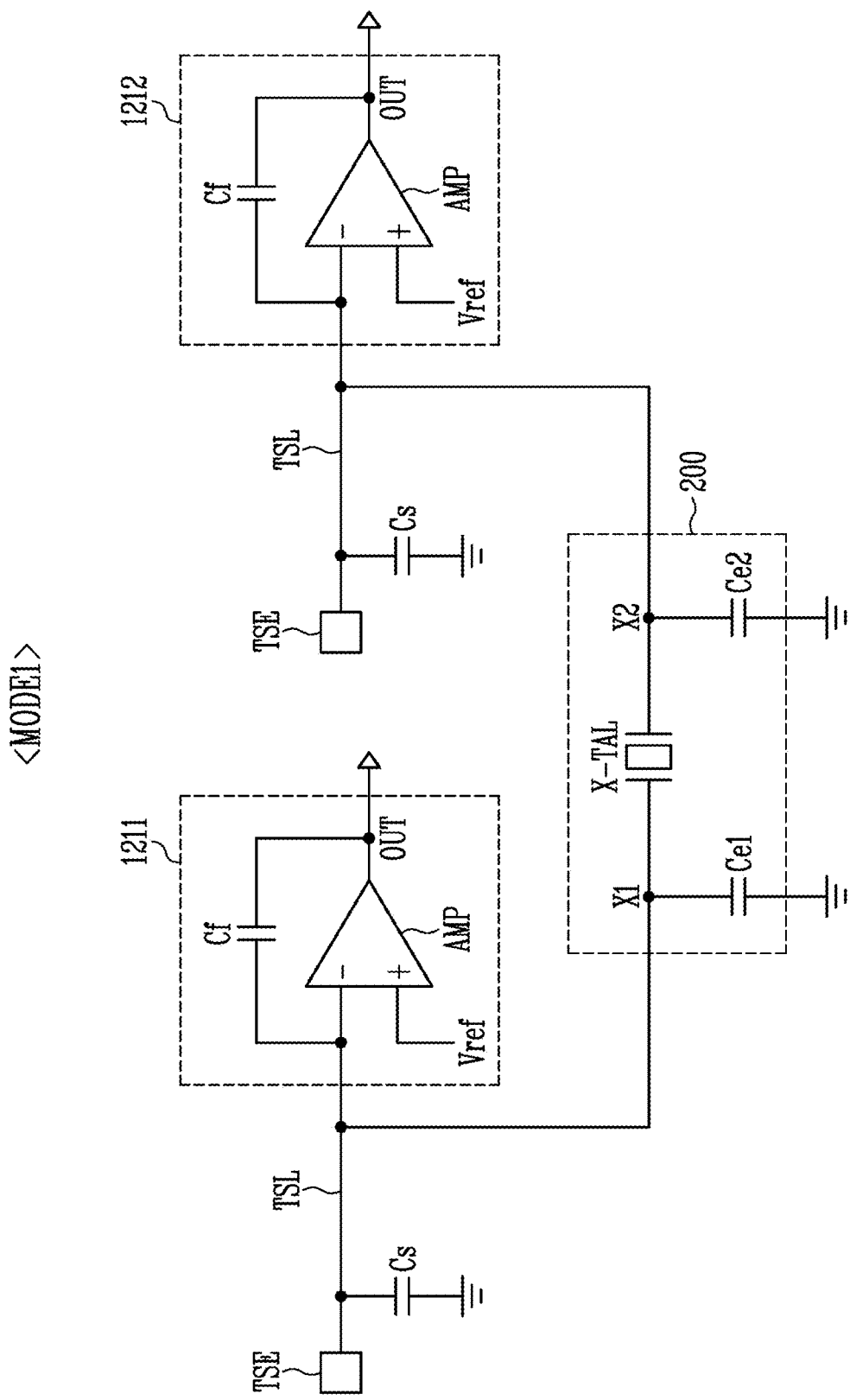
FIG. 7 illustrates a connection structure of a crystal unit in a first mode according to an embodiment of the present disclosure.

FIG. 7 illustrates a connection structure of a crystal unit in a first mode according to an embodiment of the present disclosure. For convenience of explanation, FIG. 7 only illustrates two touch electrodes TSE and two sensing channels 1211 and 1212 connected thereto.

Referring to FIG. 7, in the first mode MODE1, the first terminal X1 and the second terminal X2 of the crystal unit 200 may be connected to different sensing channels 1211 and 1212. For example, in the first mode MODE1, the first terminal X1 of the crystal unit 200 may be connected to one sensing channel (or a first sensing channel) 1211 of the sensing channels 121 (see FIG. 2), and the second terminal X2 thereof may be connected to another sensing channel (or a second sensing channel) 1212 of the sensing channels 121. The first sensing channel 1211 and the second sensing channel 1212 may be different from each other.

The first terminal X1 of the crystal unit 200 may be connected to the first input terminal (−) of the first sensing channel 1211, and the second terminal X2 thereof may be connected to the first input terminal (−) of the second sensing channel 1212. The capacitance of the first external capacitor Ce1 of the crystal unit 200 may be measured through the first sensing channel 1211. The capacitance of the second external capacitor Ce2 of the crystal unit 200 may be measured through the second sensing channel 1212. That is, in some embodiments, the capacitance of the first external capacitor Ce1 and the capacitance of the second external capacitor Ce2 of the crystal unit 200 may be simultaneously measured.

Figure 8:
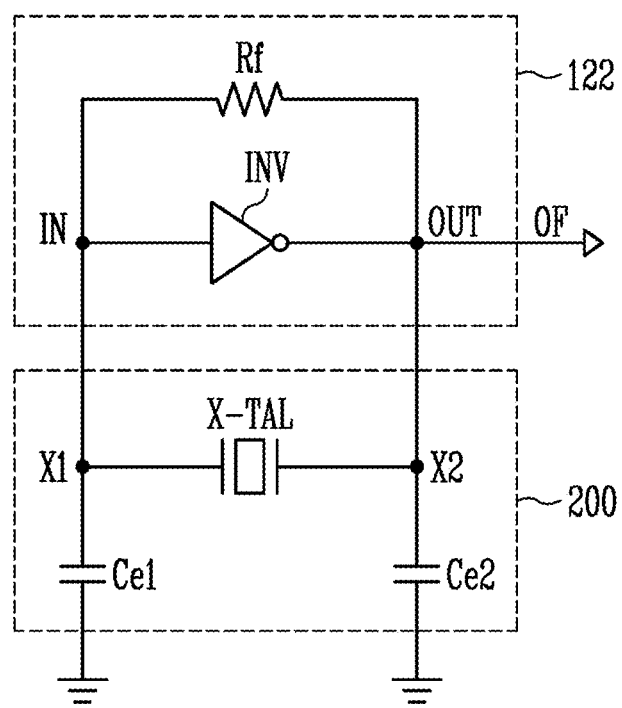
FIG. 8 illustrates a feedback circuit according to an embodiment of the present disclosure.

FIG. 8 illustrates a feedback circuit according to an embodiment of the present disclosure.

Referring to FIG. 8, the feedback circuit 122 may include an inverter INV and a feedback resistor Rf connected in parallel with the inverter INV.

In the second mode MODE2, the crystal unit 200 may be connected to the feedback circuit 122. For example, the first terminal X1 of the crystal unit 200 may be connected to an input terminal IN of the inverter INV, and the second terminal X2 thereof may be connected to an output terminal OUT thereof. The feedback circuit 122 may amplify a frequency signal generated by the crystal unit 200. Accordingly, the feedback circuit 122 may output the oscillation frequency OF of the crystal oscillator X-TAL through the output terminal OUT.

In this way, by measuring the capacitance of the first external capacitor Ce1 and the capacitance of the second external capacitor Ce2 of the crystal unit 200 using the sensing channels 121 of the touch controller 120, embodiments may accurately inspect defects of the crystal unit 200 caused by the first external capacitor Ce1 and the second external capacitor Ce2.

Furthermore, when there is a defect in the oscillation frequency OF output through the feedback circuit 122 in the second mode MODE2, for example, when the oscillation frequency OF deviates from the natural frequency of the crystal oscillator X-TAL or is unstable, it may be determined that a defect has occurred in the crystal oscillator X-TAL. Accordingly, embodiments may accurately inspect whether the defect of the crystal unit 200 is caused by the crystal oscillator X-TAL rather than the first external capacitor Ce1 and the second external capacitor Ce2.

Figure 9:
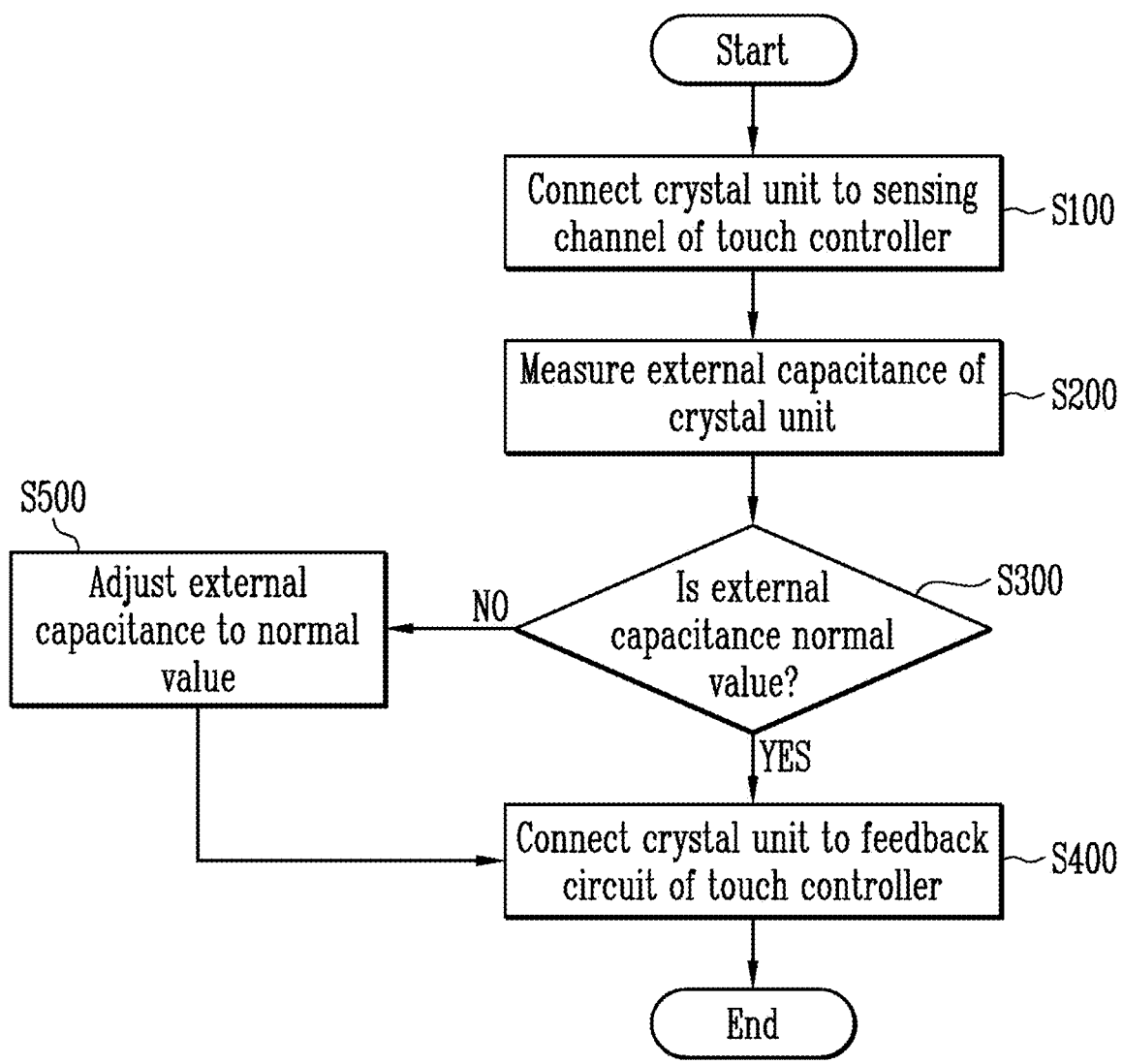
FIG. 9 illustrates an inspecting method of a display device according to an embodiment of the present disclosure.

FIG. 9 illustrates an inspecting method of a display device according to an embodiment of the present disclosure. For convenience of explanation, a further description of components and technical aspects previously described will be simplified or omitted.

Referring to FIGS. 2 and 9, the crystal unit 200 is connected to at least one sensing channel 121 of the touch controller 120 (S100), and the external capacitance of the crystal unit 200 is measured (S200). The external capacitance may refer to the capacitance of the first external capacitor Ce1 and the capacitance of the second external capacitor Ce2 (see FIG. 5).

Referring to FIGS. 5 and 9, according to an embodiment, the first terminal X1 of the crystal unit 200 is connected to one sensing channel 1211 (S100), allowing for the capacitance of the first external capacitor Ce1 to be measured (S200).

Referring to FIGS. 6 and 9, according to an embodiment, the second terminal X2 of the crystal unit 200 is connected to one sensing channel 1211 (S100), allowing for the capacitance of the second external capacitor Ce2 to be measured (S200).

The order of measurement of the capacitance of the first external capacitor Ce1 and the capacitance of the second external capacitor Ce2 is not particularly limited.

Referring to FIGS. 7 and 9, according to an embodiment, the first terminal X1 of the crystal unit 200 may be connected to one sensing channel 1211 and the second terminal X2 thereof may be connected to the other sensing channel 1212 (S100), allowing for the capacitance of the first external capacitor Ce1 and the capacitance of the second external capacitor Ce2 to be simultaneously measured (S200).

Referring to FIG. 9, it is determined whether the measured external capacitance is a normal value (S300). For example, when the capacitance of the first external capacitor Ce1 and the capacitance of the second external capacitor Ce2 satisfy the load capacitance and/or negative resistance, it may be determined that the capacitance of the first external capacitor Ce1 and the capacitance of the second external capacitor Ce2 are normal values. Otherwise, it may be determined that the capacitance of the first external capacitor Ce1 and the capacitance of the second external capacitor Ce2 are not normal values.

Referring to FIGS. 8 and 9, when the measured external capacitance is a normal value, the crystal unit 200 is connected to the feedback circuit 122 of the touch controller 120 (see FIG. 2) (S400). When the oscillation frequency OF output from the feedback circuit 122 is normal, it is determined that the first external capacitor Ce1, the second external capacitor Ce2, and the crystal oscillator X-TAL are normal, and the inspection is terminated. When the oscillation frequency OF output from the feedback circuit 122 is defective, it is determined that the crystal oscillator X-TAL is defective, and the inspection is terminated.

Referring to FIG. 9, when the measured external capacitance is not a normal value, the external capacitance is adjusted to a normal value (S500). For example, the first external capacitor Ce1 and/or the second external capacitor Ce2 may be replaced or repaired. Thereafter, the crystal unit 200 is connected to the feedback circuit 122 of the touch controller 120 (see FIG. 2) (S400), and the subsequent operation is the same as described above.

FIGS. 10 to 16 illustrate a configuration of a display device according to an embodiment of the present disclosure.

Figure 10:
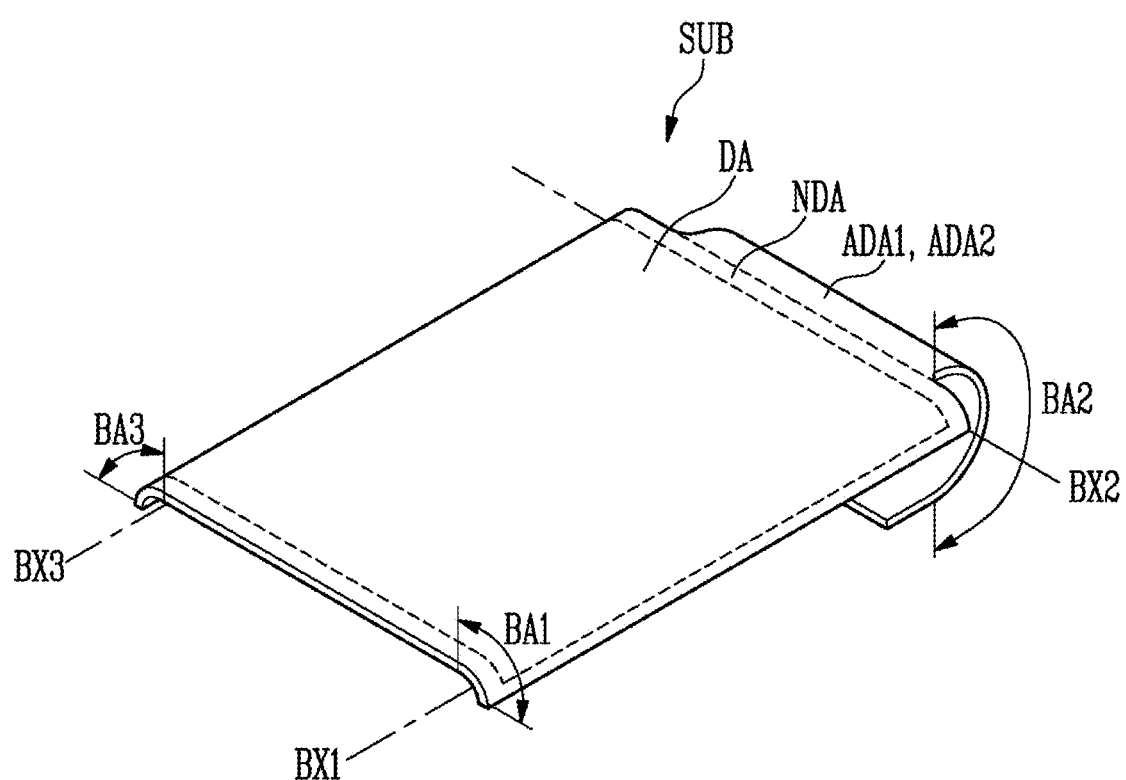
FIGS. 10 to 16 illustrate a configuration of a display device according to an embodiment of the present disclosure.
Figure 11:
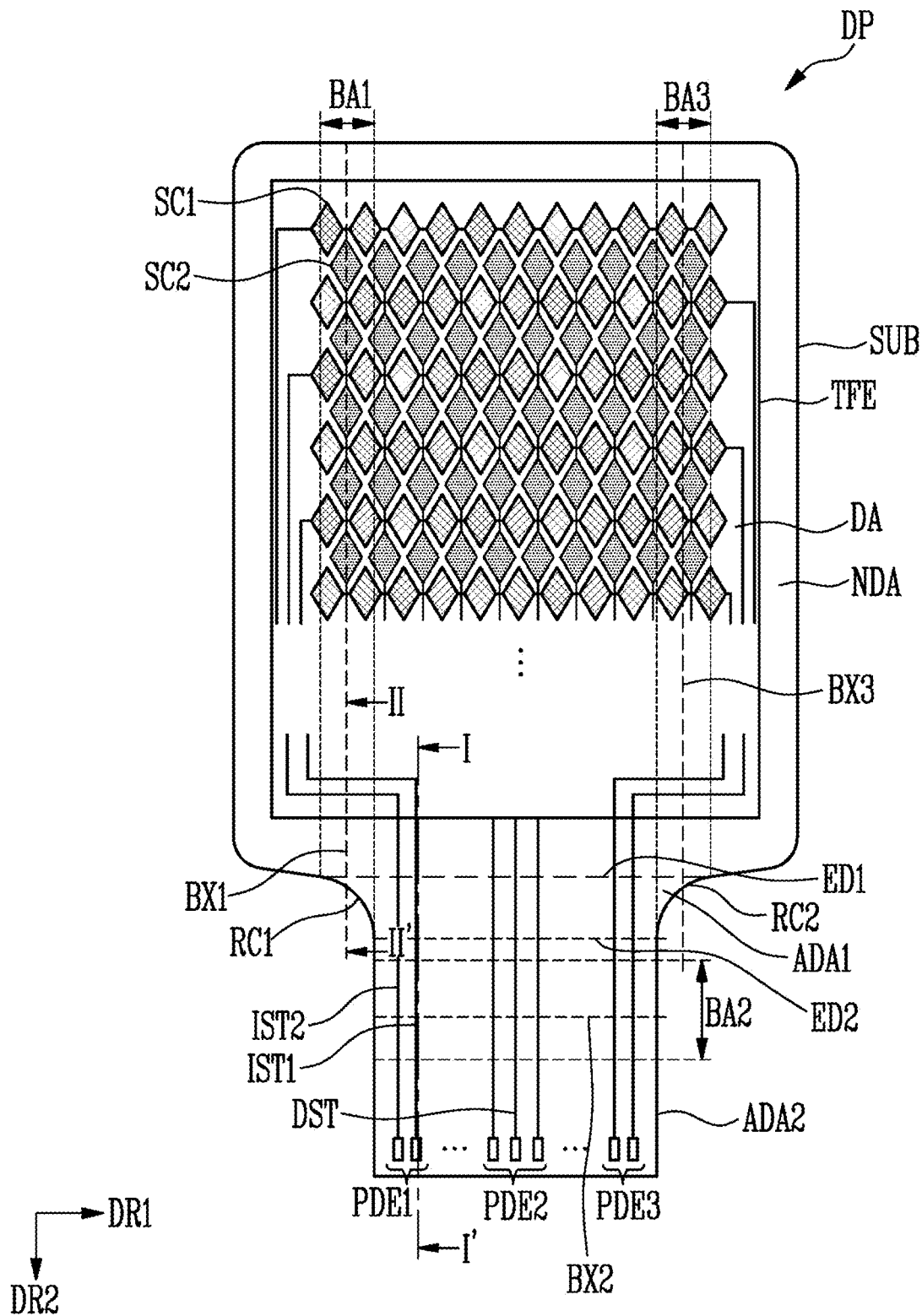

FIG. 10 illustrates a substrate according to the embodiment of the present disclosure, and FIG. 11 illustrates a display device according to the embodiment of the present disclosure.

In the following description, a position of a plane may be defined by a first direction DR1 and a second direction DR2, and a position of a height may be defined by a third direction DR3 (see FIG. 12). The first direction DR1, the second direction DR2, and third direction DR3 may be directions orthogonal to each other.

A substrate SUB may include a display area DA, a non-display area NDA, a first additional area ADA1, and a second additional area ADA2.

The display area DA may have a rectangular shape. Each corner of the display area DA may have an angled shape or a curved shape. In addition, in a case of a circular display, the display area DA may have a circular shape. In addition, the display area DA may have a polygonal shape other than a quadrangular shape and an elliptical shape. As such, the shape of the display area DA may be differently set depending on a product.

Pixels may be disposed in the display area DA. Depending on a type of the display device DP, respective pixels may include a light emitting diode or a liquid crystal layer.

The non-display area NDA may surround a periphery of the display area DA. For example, the non-display area NDA may have a rectangular shape. Each corner of the non-display area NDA may have an angled shape or a curved shape. FIG. 10 illustrates a case in which each corner of the non-display area NDA has a curved shape. The non-display area NDA may have a circular shape. A shape of the non-display area NDA may be similar to that of the display area DA, and as a result, the size of the non-display area NDA may be reduced and a narrow bezel structure may be achieved.

The first additional area ADA1 may be disposed between the non-display area NDA and the second additional area ADA2. The first additional area ADA1 may be connected to the non-display area NDA at a first boundary ED1. The first additional area ADA1 may be connected to the second additional area ADA2 at a second boundary ED2. The first boundary ED1 and the second boundary ED2 may extend in the first direction DR1, respectively.

A width of the first additional area ADA1 may become narrower from the first boundary ED1 to the second boundary ED2. That is, the width of the first additional area ADA1 in the first direction DR1 may become narrower toward the second direction DR2. Accordingly, the first additional area ADA1 may include curved first and second lateral surfaces RC1 and RC2. The lateral surfaces RC1 and RC2 may be concave toward the inside of the substrate (for example, a center of the substrate).

In FIG. 11, in an embodiment, the first additional area ADA1 is illustrated as including two lateral surfaces RC1 and RC2 in the first direction DR1 and an opposite direction thereof. In an embodiment, the first additional area ADA1 may include only the first lateral surface RC1 because the boundary positioned in the first direction DR1 coincides with the boundary of the non-display area NDA. In an embodiment, the first additional area ADA1 may include only the second lateral surface RC2 because the boundary positioned in the opposite direction of the first direction DR1 coincides with the boundary of the non-display area NDA.

The second additional area ADA2 may have a rectangular shape. Each corner positioned in the second direction DR2 of the second additional area ADA2 may have an angled shape or a curved shape. FIG. 11 illustrates a case in which each corner positioned in the second direction DR2 of the second additional area ADA2 has an angled shape.

An encapsulation film TFE may be disposed on the pixels. For example, the encapsulation film TFE may cover the pixels in the display area DA, and a boundary of the encapsulation film TFE may be disposed in the non-display area NDA. The encapsulation film TFE covers the light emitting elements and the circuit elements of the pixels of the display area DA, which may prevent damage from external moisture or impact.

Sensing electrodes SC1 and SC2 (equivalent to the touch electrode TSE in FIG. 1) may be disposed on the encapsulation film TFE. The sensing electrodes SC1 and SC2 may detect, for example, a touch, hovering, gesture, proximity, or the like by the user's body (e.g., the user's finger). The sensing electrodes SC1 and SC2 have different shapes according to various types such as, for example, a resistive type, a capacitive type, an electro-magnetic (EM) type, and an optical type. For example, when the sensing electrodes SC1 and SC2 are configured in a capacitive type, the sensing electrodes SC1 and SC2 may be configured in a self-capacitive type or a mutual-capacitive type. Hereinafter, for better understanding and ease of description, a case in which the sensing electrodes SC1 and SC2 are configured in a mutual-capacitive type will be described as an example.

When the sensing electrodes SC1 and SC2 are configured in a mutual capacitive type, a driving signal is transmitted through a sensing wire corresponding to the first sensing electrode SC1, and a sensing signal may be received through a sensing wire corresponding to the second sensing electrode SC2 forming mutual capacitance with the first sensing electrode SC1. When the user's body approaches, the mutual capacitance between the first sensing electrode SC1 and the second sensing electrode SC2 may be changed, and depending on a difference between the sensing signals, a touch input from the user may be detected. In an embodiment, a driving signal is transmitted through a sensing wire corresponding to the second sensing electrode SC2, and a sensing signal may be received through a sensing wire corresponding to the first sensing electrode SC1 forming mutual capacitance with the second sensing electrode SC2.

Pads PDE1, PDE2, and PDE3 may be disposed in the second additional area ADA2. The pads PDE1 and PDE3 may be connected to the sensing electrodes SC1 and SC2 disposed on the encapsulation film TFE through sensing wires IST1 and IST2. The pads PDE1 and PDE3 may be connected to an external touch integrated chip (IC). In addition, the pads PDE2 may be connected to pixels or a driver of the pixels disposed under the encapsulation film TFE through display wires DST. The driver may include, for example, a scan driver, a light emission driver, a data driver, and the like. The driver may be disposed under the encapsulation film TFE, or may be disposed on an external display IC connected through the pads PDE2.

When the display device DP is a mutual capacitance type, the touch IC may transmit a driving signal through the first sensing wire IST1, and may receive a sensing signal through the second sensing wire IST2. In an embodiment, the driving signal may be transmitted through the second sensing wire IST2, and the sensing signal may be received through the first sensing wire IST1. For reference, when the display device DP is a self-capacitance type, there may be no difference in driving methods of the first sensing wire IST1 and the second sensing wire IST2. The display wires DST may include, for example, a control line, a data line, a power line, etc., and may provide signals so that the pixels may display an image. These signals may be provided from a driver connected to the display wires DST.

FIG. 10 illustrates a state in which the substrate SUB is bent, and FIG. 11 illustrates a state in which the substrate SUB is not bent.

The display device DP may be bent as shown in FIG. 10 after elements are stacked on the substrate SUB in a state that is not bent as shown in FIG. 11.

The substrate SUB may include a first bending area BA1 extending from the first lateral surface RC1 of the first additional area ADA1 to overlap the non-display area NDA. Additionally, the first bending area BA1 may extend to overlap the display area DA. That is, each of the display area DA, the non-display area NDA, and the first additional area ADA1 may partially overlap the first bending area BA1. The first bending area BA1 may have a width in the first direction DR1, and may extend in length in the second direction DR2. A first bending axis BX1 may be defined as a folding line extending from a center of the first bending area BA1 in the second direction DR2. In some embodiments, the first bending area BA1 may be a portion in which a stress is reduced by removing a portion of an insulating film thereof, unlike other portions in the vicinity thereof. In some embodiments, the first bending area BA1 may have the same configuration as other portions around it.

The substrate SUB may include a third bending area BA3 extending from the second lateral surface RC2 of the first additional area ADA1 to overlap the non-display area NDA. Additionally, the third bending area BA3 may extend to overlap the display area DA. That is, each of the display area DA, the non-display area NDA, and the first additional area ADA1 may partially overlap the third bending area BA3. The third bending area BA3 may have a width in the first direction DR1, and may extend in length in the second direction DR2. A third bending axis BX3 may be defined as a folding line extending from a center of the third bending area BA3 in the second direction DR2. In some embodiments, the third bending area BA3 may be a portion in which a stress is reduced by removing a portion of an insulating film thereof, unlike other portions in the vicinity thereof. In some embodiments, the third bending area BA3 may have the same configuration as other portions around it.

The second additional area ADA2 may include a second bending area BA2. The second bending area BA2 may have a width in the second direction DR2, and may extend in length in the first direction DR1. A second bending axis BX2 may be defined as a folding line extending from a center of the second bending area BA2 in the first direction DR1. In some embodiments, the second bending area BA2 may be a portion in which a stress is reduced by removing a portion of an insulating film thereof, unlike other portions in the vicinity thereof. In some embodiments, the second bending area BA2 may have the same configuration as other portions around it.

According to embodiments, the first to third bending areas BA1, BA2, and BA3 do not overlap each other.

Herein, the term "folded" means that a shape is not fixed, but an original shape may be changed to another shape, and the shape is folded, curved, or rolled along one or more bending axes. By the first and third bending areas BA1 and BA3, the side bezel width of the opposite direction of the first direction DR1 of the display device DP and a width of the side bezel of the first direction DR1 may be reduced. In addition, a width of the side bezel of the second direction DR2 of the display device DP may be reduced by the second bending area BA2.

Figure 12:
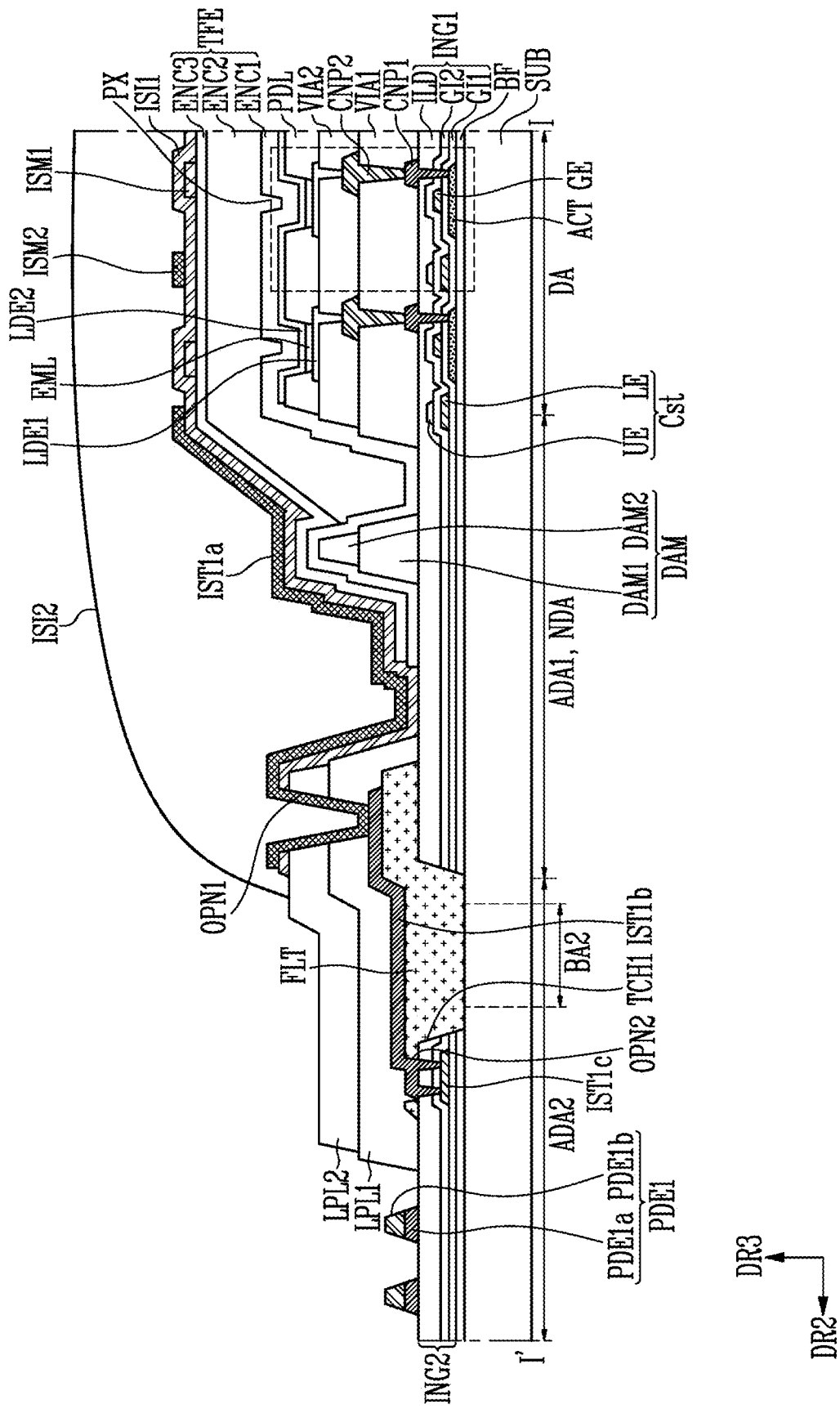

FIG. 12 illustrates a cross-sectional view taken along line I-I' of FIG. 11. It is assumed that line I-I' in FIG. 11 passes through the first pad PDE1 and the first sensing wire IST1.

First, the display area DA will be described. In an embodiment, pixels PX are provided in the display area DA. Each pixel PX may include a transistor connected to a corresponding wire among the display wires DST, a light emitting element connected to the transistor, and a capacitor Cst. In FIG. 12, for better understanding and ease of description, one transistor, one light emitting element, and one capacitor Cst are illustrated as an example for one pixel PX.

The substrate SUB may be made of an insulating material such as, for example, glass or a resin. In addition, the substrate SUB may be made of a flexible material to be bendable or foldable, and may have a single-layered structure or a multi-layered structure.

For example, the substrate SUB may include at least one of polystyrene, polyvinyl alcohol, polymethyl methacrylate, polyethersulfone, polyacrylate, polyetherimide, polyethylene naphthalate, polyethylene terephthalate, polyphenylene sulfide, polyarylate, polyimide, polycarbonate, triacetate cellulose, and cellulose acetate propionate. However, the material included in the substrate SUB may be variously changed, and may also include, for example, fiber reinforced plastic (FRP).

For example, when the substrate SUB has a multi-layered structure, inorganic materials such as a silicon nitride, a silicon oxide, and a silicon oxynitride may be interposed between a plurality of layers in a single layer or in a plurality of layers.

A buffer film BF may cover the substrate SUB. The buffer film BF may prevent impurities from diffusing into a channel of the transistor. The buffer film BF may be an inorganic insulating film made of an inorganic material. For example, the buffer film BF may be made of a silicon nitride, a silicon oxide, a silicon oxynitride, or the like, and may be omitted depending on the materials and the process conditions of the substrate SUB. In some embodiments, a barrier layer may be further provided.

An active film ACT may be disposed on the buffer film BF. The active film ACT may be patterned to form a channel, a source electrode, and a drain electrode of a transistor, or to form a wire. The active film ACT may be made of a semiconductor material. The active film ACT may be a semiconductor pattern made of, for example, polysilicon, amorphous silicon, or an oxide semiconductor. The channel of the transistor is a semiconductor pattern that is not doped with an impurity, and may be an intrinsic semiconductor. The source electrode, the drain electrode, and the wire may be a semiconductor pattern doped with an impurity. An N-type impurity, a P-type impurity, and other impurities such as metal may be used as the impurity.

A first gate insulating film GI1 may cover the active film ACT. The first gate insulating film GI1 may be an inorganic insulating film made of an inorganic material. For example, an inorganic insulating material such as a silicon nitride, a silicon oxide, or a silicon oxynitride may be used as the inorganic material, or the first gate insulating film GI1 may be made of polysiloxane.

A gate electrode GE of the transistor and a lower electrode LE of the capacitor Cst may be disposed on the first gate insulating film GI1. The gate electrode GE may overlap an area corresponding to the channel.

The gate electrode GE and the lower electrode LE may be made of metal. For example, the gate electrode GE may be made of at least one of metals such as gold (Au), silver (Ag), aluminum (Al), molybdenum (Mo), chromium (Cr), titanium (Ti), nickel (Ni), neodymium (Nd), and copper (Cu), or an alloy thereof. In addition, the gate electrode GE may be formed as a single film, or may be formed as a multi-film in which two or more materials among metals and alloys are stacked.

A second gate insulating film GI2 may cover the gate electrode GE and the lower electrode LE. The second gate insulating film GI2 may be an inorganic insulating film made of an inorganic material. For example, a silicon nitride, a silicon oxide, and a silicon oxynitride may be used as the inorganic material, or the second gate insulating film GI2 may be made of polysiloxane.

An upper electrode UE of the capacitor Cst may be disposed on the second gate insulating film GI2. The upper electrode UE of the capacitor Cst may be made of metal. For example, the upper electrode UE may be made of at least one of metals such as gold (Au), silver (Ag), aluminum (Al), molybdenum (Mo), chromium (Cr), titanium (Ti), nickel (Ni), neodymium (Nd), and copper (Cu), or an alloy thereof. In addition, the upper electrode UE may be formed as a single film, or as a multi-film in which two or more materials among metals and alloys are stacked.

The lower electrode LE and the upper electrode UE may configure the capacitor Cst with the second gate insulating film GI2 interposed therebetween. In FIG. 12, the capacitor Cst is shown to have a two-layered electrode structure of the lower electrode LE and the upper electrode UE. However, embodiments are not limited thereto. For example, in an embodiment, the capacitor Cst may have a three-layered electrode structure by using the active film ACT, or may have a three-layer electrode structure or a four or more layered structure by using an electrode of the same layer as a first connection pattern CNP1.

An interlayer insulating film ILD may cover the upper electrode UE. The interlayer insulating film ILD may be an inorganic insulating film made of an inorganic material. For example, a silicon nitride, a silicon oxide, and a silicon oxynitride may be used as the inorganic material, or the interlayer insulating film ILD may be made of polysiloxane.

For better understanding and ease of description, the first gate insulating film GI1, the second gate insulating film GI2, and the interlayer insulating film ILD may be referred to as a first insulating film group ING1. The first insulating film group ING1 may cover a portion of the transistor. In some embodiments, the first insulating film group ING1 may further include the buffer film BF.

The first connection pattern CNP1 may be disposed on the interlayer insulating film ILD. The first connection patterns CNP1 may contact a source electrode and a drain electrode of the active film ACT through contact holes formed in the interlayer insulating film ILD, the second gate insulating film GI2, and the first gate insulating film GI1, respectively.

The first connection pattern CNP1 may be made of metal. For example, the first connection pattern CNP1 may be made of at least one of metals such as gold (Au), silver (Ag), aluminum (Al), molybdenum (Mo), chromium (Cr), titanium (Ti), nickel (Ni), neodymium (Nd), and copper (Cu), or an alloy thereof.

In some embodiments, the passivation film may cover the first connection pattern CNP1. The passivation film may be an inorganic insulating film made of an inorganic material. For example, a silicon nitride, a silicon oxide, and a silicon oxynitride may be used as the inorganic material, or the passivation film may be made of polysiloxane.

A first via film VIA1 may cover the passivation film or the transistor. The first via film VIA1 may be an organic insulating film made of an organic material. For example, an organic insulating material such as a polyacrylic compound, a polyimide compound, a fluorine-based carbon compound such as Teflon, a benzocyclobutene compound, and the like may be used as the organic material. The organic insulating film may be deposited by a method such as evaporation.

A second connection pattern CNP2 may be connected to the first connection pattern CNP1 through the opening of the first via film VIA1. The second connection pattern CNP2 may be made of at least one of metals such as gold (Au), silver (Ag), aluminum (Al), molybdenum (Mo), chromium (Cr), titanium (Ti), nickel (Ni), neodymium (Nd), and copper (Cu), or an alloy thereof.

A second via film VIA2 may cover the first via film VIA1 and the second connection pattern CNP2. The second via film VIA2 may be an organic insulating film made of an organic material. For example, an organic insulating material such as a polyacrylic compound, a polyimide compound, a fluorine-based carbon compound such as Teflon, a benzocyclobutene compound, and the like may be used as the organic material.

A first light emitting element electrode LDE1 may be connected to the second connection pattern CNP2 through the opening of the second via film VIA2. Here, the first light emitting element electrode LDE1 may be an anode of the light emitting element in some embodiments.

In some embodiments, the configuration of the second via film VIA2 and the second connection pattern CNP2 may be omitted, and the first light emitting element electrode LDE1 may be directly connected to the first connection pattern CNP1 through the opening of the first via film VIA1.

The first light emitting element electrode LDE1 may be made of a metal film such as, for example, Ag, Mg, Al, Pt, Pd, Au, Ni, Nd, Ir, Cr, and an alloy thereof and/or, transparent conductive film such as, for example, an indium tin oxide (ITO), an indium zinc oxide (IZO), a zinc oxide (ZnO), and indium tin zinc oxide (ITZO). The first light emitting element electrode LDE1 may be made of one type of metal, but is not limited thereto, and may be made of two or more types of metals, for example, an alloy of Ag and Mg.

The first light emitting element electrode LDE1 may be formed of a transparent conductive film when an image is to be provided in a lower direction of the substrate SUB, and may be formed of a metal reflective film and/or a transparent conductive film when an image is to be provided in an upper direction of the substrate SUB.

A pixel defining film PDL partitioning a light emitting area of each pixel PX is provided on the substrate SUB on which the first light emitting element electrode LDE1 is formed. The pixel defining film PDL may be an organic insulation layer made of an organic material. For example, an organic insulating material such as a polyacrylic compound, a polyimide compound, a fluorine-based carbon compound such as Teflon, a benzocyclobutene compound, and the like may be used as the organic material.

The pixel defining film PDL may expose an upper surface of the first light emitting element electrode LDE1, and may protrude from the substrate SUB along a circumference of the pixel PX. A light emitting film EML may be provided in an area of the pixel PX surrounded by the pixel defining film PDL.

The light emitting film EML may include a low-molecular or high-molecular material. The low-molecular material may include, for example, a copper phthalocyanine (CuPc), N,N'-Di(naphthalene-1-yl)-N,N'-diphenyl-benzidine (NPB), tris-8-hydroxyquinoline aluminum ($Alq_3$), and the like. These materials may be formed by a method of, for example, vacuum deposition. The high-molecular material may include, for example, PEDOT, a poly-phenylenevinylene (PPV)-based material, and a polyfluorene-based material.

The light emitting film EML may be provided as a single layer, or may be provided as a multilayer including various functional layers. When the light emitting film EML is provided as a multilayer, it may have a structure in which a hole injection layer (HIL), a hole transport layer (HTL), an emission layer, an electron transport layer (ETL), and an electron injection layer (EIL) are stacked in a single or complex structure. Such an light emitting film EML may be formed, for example, by a screen printing method, an inkjet printing method, or a laser induced thermal imaging (LITI) method.

In some embodiments, at least a portion of the light emitting film EML may be integrally formed on a plurality of first light emitting element electrodes LDE1, or may be individually provided to correspond to each of the plurality of first light emitting element electrodes LDE1.

A second light emitting element electrode LDE2 may be provided on the light emitting film EML. The second light emitting element electrode LDE2 may be provided for each pixel PX, but may be provided to cover most of the display area DA, and may be shared by a plurality of pixels PX.

In some embodiments, the second light emitting element electrode LDE2 may be used as a cathode or an anode. When the first light emitting element electrode LDE1 is an anode, the second light emitting element electrode LDE2 may be used as a cathode. When the first light emitting element electrode LDE1 is a cathode, the second light emitting element electrode LDE2 may be used as an anode.

The second light emitting element electrode LDE2 may be formed of a metal film such as, for example, Ag, Mg, Al, Pt, Pd, Au, Ni, Nd, Ir, Cr, and/or a transparent conductive film such as, for example, an indium tin oxide (ITO), an indium zinc oxide (IZO), a zinc oxide (ZnO), and indium tin zinc oxide (ITZO). In an embodiment, the second light emitting element electrode LDE2 may be formed of a multi-film of a double film or more including a metal thin film, for example, a triple-film of ITO/Ag/ITO.

The second light emitting element electrode LDE2 may be formed of a metal reflective film and/or a transparent conductive film when an image is to be provided in a lower direction of the substrate SUB, and may be formed of a transparent conductive film when an image is to be provided in an upper direction of the substrate SUB.

A set of the first light emitting element electrode LDE1, the light emitting film EML, and the second light emitting element electrode LDE2 described above may be referred to as a light emitting element.

The encapsulation film TFE may be provided on the second light emitting element electrode LDE2. The encapsulation film TFE may be formed as a single layer or as a multilayer. In an embodiment, the encapsulation film TFE may include first to third encapsulation films ENC1, ENC2, and ENC3. The first to third encapsulation films ENC1, ENC2, and ENC3 may be made of an organic material and/or an inorganic material. The third encapsulation film ENC3 disposed at the outermost portion may be made of an inorganic material. For example, the first encapsulation film ENC1 may be an inorganic film made of an inorganic material, the second encapsulation film ENC2 may be an organic film made of an organic material, and the third encapsulation film ENC3 may be an inorganic film made of an inorganic material. The inorganic material has less penetration of moisture and oxygen than the organic material, but is more vulnerable to cracks due to its low elasticity or flexibility. Propagation of cracks may be prevented by forming the first encapsulation film ENC1 and the third encapsulation film ENC3 with an inorganic material and forming the second encapsulation film ENC2 with an organic material. Here, in an embodiment, the layer made of the organic material, that is, the second encapsulation film ENC2, may be completely covered by the third encapsulation film ENC3 so that an end portion thereof is not exposed to the outside. An organic insulating material such as, for example, a polyacrylic compound, a polyimide compound, a fluorine-based carbon compound such as Teflon, a benzocyclobutene compound, and the like may be used as the organic material, and a silicon nitride, a silicon oxide, a silicon oxynitride, and the like may be used as the inorganic material. In addition, polysiloxane may be used to form first and third encapsulation films ENC1 and ENC3.

The light emitting film EML that forms the light emitting element may be damaged by moisture or oxygen from the outside. The encapsulation film TFE protects the light emitting film EML by covering it. The encapsulation film TFE covers the display area DA, and may extend to the non-display area NDA disposed outside of the display area DA. However, although the insulating films made of an organic material may provide flexibility and elasticity, they allow moisture and oxygen to permeate more readily than the insulating film made of an inorganic material. In an embodiment, to prevent penetration of moisture or oxygen through the insulating films made of an organic material, the end portions of the insulating films made of an organic material may be covered by the insulating films made of an inorganic material so as to not be exposed to the outside. For example, in an embodiment, the first via film VIA1, the second via film VIA2, and pixel defining film PDL made of an organic material do not continuously extend to the non-display area NDA, and may be covered by the first encapsulation film ENC1. Accordingly, an upper surface of the pixel defining film PDL, and side surfaces of the first via film VIA1, the second via film VIA2 and the pixel defining film PDL are encapsulated by the encapsulation film TFE including an inorganic material, so that they may be prevented to be exposed to the outside.

However, whether the encapsulation film TFE is multi-layered or the material thereof is not limited thereto, and may be variously changed. For example, according to embodiments, the encapsulation film TFE may include a plurality of organic material layers and a plurality of inorganic material layers alternately stacked.

A first sensing electrode layer ISM1 may be disposed on the encapsulation film TFE. In some embodiments, an additional buffer film may be disposed between the first sensing electrode layer ISM1 and the encapsulation film TFE. The first sensing electrode layer ISM1 may be formed of a metal film such as, for example, Ag, Mg, Al, Pt, Pd, Au, Ni, Nd, Ir, Cr, and/or a transparent conductive film such as, for example, an indium tin oxide (ITO), an indium zinc oxide (IZO), a zinc oxide (ZnO), and indium tin zinc oxide (ITZO).

A first sensing insulating film ISI1 may be disposed on the first sensing electrode layer ISM1. The first sensing insulating film ISI1 may be an inorganic insulating film made of an inorganic material. For example, an inorganic insulating material such as a silicon nitride, a silicon oxide, or a silicon oxynitride may be used as the inorganic material, or the first sensing insulating film ISI1 may be made of polysiloxane.

A second sensing electrode layer ISM2 may be disposed on the first sensing insulating film ISI1. The second sensing electrode layer ISM2 may be formed of a metal film such as, for example, Ag, Mg, Al, Pt, Pd, Au, Ni, Nd, Ir, Cr, and/or a transparent conductive film such as, for example, an indium tin oxide (ITO), an indium zinc oxide (IZO), a zinc oxide (ZnO), and indium tin zinc oxide (ITZO).

Various input detectors may be configured by using the first sensing electrode layer ISM1, the first sensing insulating film ISI1, and the second sensing electrode layer ISM2, which will be described in further detail below with reference to FIGS. 13 to 15.

In an embodiment of FIG. 12, the second sensing electrode layer ISM2 may be patterned to configure a first pattern IST1a of the first sensing wire IST1.

A second sensing insulating film ISI2 may be disposed on the second sensing electrode layer ISM2. The second sensing insulating film ISI2 may be formed of an organic film. For example, an organic insulating material such as a polyacrylic compound, a polyimide compound, a fluorine-based carbon compound such as Teflon, a benzocyclobutene compound, and the like may be used as the organic material. For example, the second sensing insulating film ISI2 may be made of polymethyl methacrylate, polydimethylsiloxane, polyimide, acrylate, polyethylen terephthalate, or polyethylen naphthalate.

Hereinafter, the non-display area NDA, the first additional area ADA1, and the second additional area ADA2 will be described. In the cross-sectional view of FIG. 12, since the distinction between the non-display area NDA and the first additional area ADA1 is not a feature related to the gist of the present invention, the non-display area NDA and the first additional area ADA1 will not be separately described. Hereinafter, in the description of the non-display area NDA and the second additional area ADA2, for convenience of explanation, a further description of components and technical aspects previously described will be omitted or simply described.

A dam DAM may be disposed at a boundary of the second encapsulation film ENC2. For example, the dam DAM may be disposed between a planarization film FLT and the second encapsulation film ENC2. The dam DAM may have a multi-layered structure, and for example, may include a first dam DAM1 and a second dam DAM2. For example, the first and second dams DAM1 and DAM2 may be made of an organic material. Each of the first and second dams DAM1 and DAM2 may correspond to one of the first via film VIA1, the second via film VIA2, and the pixel defining film PDL. For example, when the first dam DAM1 is made of the same material through the same process as the first via film VIA1, the second dam DAM2 may be made of the same material through the same process as the second via film VIA2 or the pixel defining film PDL. In an embodiment, when the first dam DAM1 is made of the same material through the same process as the second via film VIA2, the second dam DAM2 may be made of the same material through the same process as the pixel defining film PDL. In addition, when a spacer is formed on the pixel defining film PDL of the display area DA, the dam DAM may be formed by using the same material as the spacer.

The dam DAM may prevent the organic material of the second encapsulation film ENC2, which has strong fluidity, from overflowing to the outside of the dam DAM during the process. The first and third encapsulation films ENC1 and ENC3 made of an inorganic material cover the dam DAM and extend beyond the dam DAM, thereby increasing adhesion to the substrate SUB or other films disposed on the substrate SUB.

The first pad PDE1 is disposed on the substrate SUB, but may be spaced apart from the planarization film FLT. The first pad PDE1 may be supported by the second insulating film group ING2. Respective insulating films of the second insulating film group ING2 may correspond to respective insulating films of the first insulating film group ING1. The first pad PDE1 may include a first pad electrode PDE1a and a second pad electrode PDE1b. The first pad electrode PDE1a may be made of the same material as the first connection pattern CNP1. The second pad electrode PDE1b may be made of the same material as the second connection pattern CNP2.

The planarization film FLT is disposed on the substrate SUB, but may be spaced apart from area covered by the encapsulation film TFE. The planarization film FLT may be an organic insulating film made of an organic material. For example, an organic insulating material such as a polyacrylic compound, a polyimide compound, a fluorine-based carbon compound such as Teflon, a benzocyclobutene compound, and the like may be used as the organic material.

In an embodiment, the planarization film FLT may be formed after the interlayer insulating film ILD is formed and before the first connection pattern CNP1 is formed. Accordingly, the planarization film FLT and the first via film VIA1 may be formed through different processes. In some embodiments, the planarization film FLT and the first via film VIA1 may include different organic materials.

One end of the planarization film FLT may cover the first insulating film group ING1. In addition, a portion of the planarization film FLT corresponding to the second bending area BA2 may fill a first trench TCH1 disposed between the first insulating film group ING1 and the second insulating film group ING2.

Since the inorganic insulating films have high hardness and low flexibility compared with the organic insulating films, the probability of occurrence of cracks is relatively high. When cracks occur in the inorganic insulating films, the cracks may propagate to wires disposed on the inorganic insulating films, and eventually, defects such as wire breakage may occur.

Accordingly, as shown in FIG. 12, in an embodiment, the inorganic insulating films are removed from the second bending area BA2, so that the first trench TCH1 may be formed, and the first insulating film group ING1 and the second insulating film group ING2 may be divided. In an embodiment illustrated in FIG. 12, it is shown that all of the inorganic insulating films corresponding to an area of the first trench TCH1 are removed. However, embodiments of the present disclosure are not limited thereto. For example, in an embodiment, some of the inorganic insulating films may remain. In this case, some remaining inorganic insulating films may include slits, thereby dispersing bending stress.

A second pattern IST1b of the first sensing wire IST1 may be extended on the planarization film FLT, and may be electrically connected to the first pad PDE1. In an embodiment, the second pattern IST1b may be made of the same material as the first connection pattern CNP1, through the same process.

A first wire protective film LPL1 may cover the planarization film FLT and the second pattern IST1b. In addition, a second wire protective film LPL2 may cover the first wire protective film LPL1. In some embodiments, the configuration of the second wire protective film LPL2 may be omitted. The first and second wire protective films LPL1 and LPL2 may be made of an organic material. Each of the first and second wire protective films LPL1 and LPL2 may correspond to one of the first via film VIA1, the second via film VIA2, and the pixel defining film PDL. For example, when the first wire protective film LPL1 is made of the same material through the same process as the first via film VIA1, the second wire protective film LPL2 may be made of the same material through the same process as the second via film VIA2 or the pixel defining film PDL. In an embodiment, when the first wire protective film LPL1 is made of the same material through the same process as the second via film VIA2, the second wire protective film LPL2 may be made of the same material through the same process as the pixel defining film PDL.

The first and second wire protective films LPL1 and LPL2 and the first sensing insulating film ISI1 may include a first opening OPN1 exposing the second pattern IST1b.

The first pattern IST1a may be connected to the second pattern IST1b through the first opening OPN1. According to an embodiment, a height of the second pattern IST1b disposed on one end of the first insulating film group ING1 and the planarization film FLT may be greater than a height of the second pattern IST1b disposed on the planarization film FLT corresponding to the first trench TCH1.

Accordingly, the first pattern IST1a and the second pattern IST1b may be directly connected without a bridge wire, and since there is no bridge wire, the connection reliability between the first pattern IST1a and the second pattern IST1b may be increased. In addition, since a length of the non-display area NDA may be reduced by as much as a length of the bridge wire, embodiments may reduce a dead space and to allow for a thin bezel.

A third pattern IST1c of the first sensing wire IST1 may connect the first pad PDE1 and the second pattern IST1b. The third pattern IST1c may be made of the same material by the same process as the gate electrode GE of the transistor. In some embodiments, the third pattern IST1c may be made of the same material by the same process as the upper electrode UE. In some embodiments, the odd numbered third pattern IST1c may be formed of the same material in the same process as the gate electrode GE of the transistor, and the even numbered third pattern IST1c may be formed of the same material in the same process as the upper electrode UE. Conversely, the even numbered third pattern IST1c may be formed of the same material in the same process as the gate electrode GE of the transistor, and the odd numbered third pattern IST1c may be formed of the same material in the same process as the upper electrode UE. Accordingly, a short circuit between adjacent wires may be more efficiently prevented.

The second insulating film group ING2 may include a second opening OPN2 exposing the third pattern IST1c. In addition, the planarization film FLT may include an opening corresponding to the second opening OPN2. The second pattern IST1b may be connected to the third pattern IST1c through the second opening OPN2.

Figure 13:
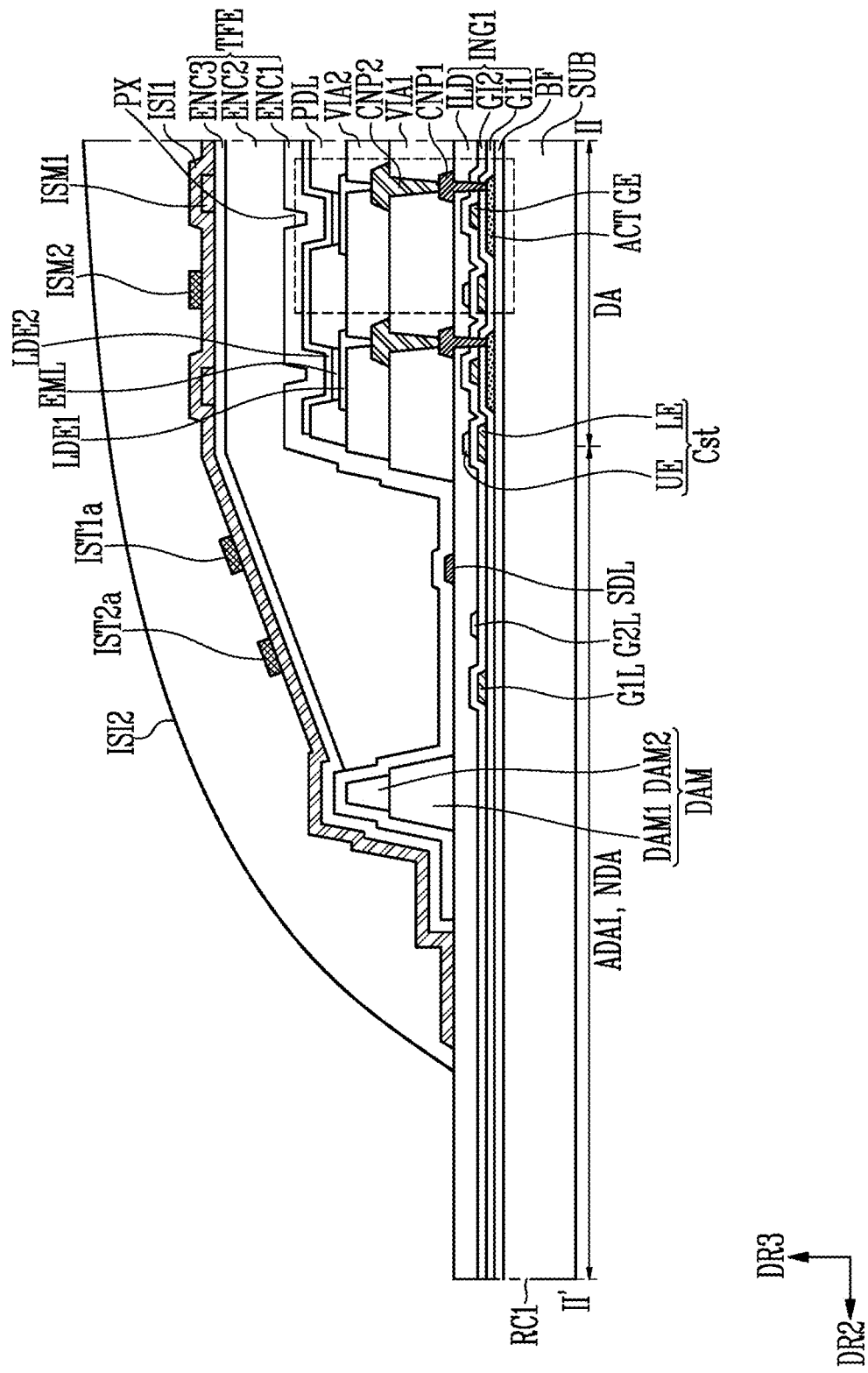

FIG. 13 illustrates a cross-sectional view taken along line II-II' of FIG. 11.

The line II-II' of FIG. 11 may correspond to the first bending axis BX1. However, the same embodiment may be applied to not only the first lateral surface RC1 but also the second lateral surface RC2.

The display wires DST may be configured of a single-layered wire or a multi-layered wire by using at least one of wires GIL, G2L, and SDL. The wire GIL may be made of the same material by the same process as the gate electrode GE. The wire G2L may be made of the same material by the same process as the upper electrode UE. The wire SDL may be made of the same material by the same process as the first connection pattern CNP1.

The patterns IST1a and IST2a of the sensing wires IST1 and IST2 are disposed on the encapsulation film TFE and the first sensing insulating film ISI1 (based on the third direction DR3), and are disposed between the dam DAM and the display area DA (based on the second direction DR2). The first sensing insulating film ISI1 may be disposed between the encapsulation film TFE and the sensing wires IST1 and IST2.

Figure 14:
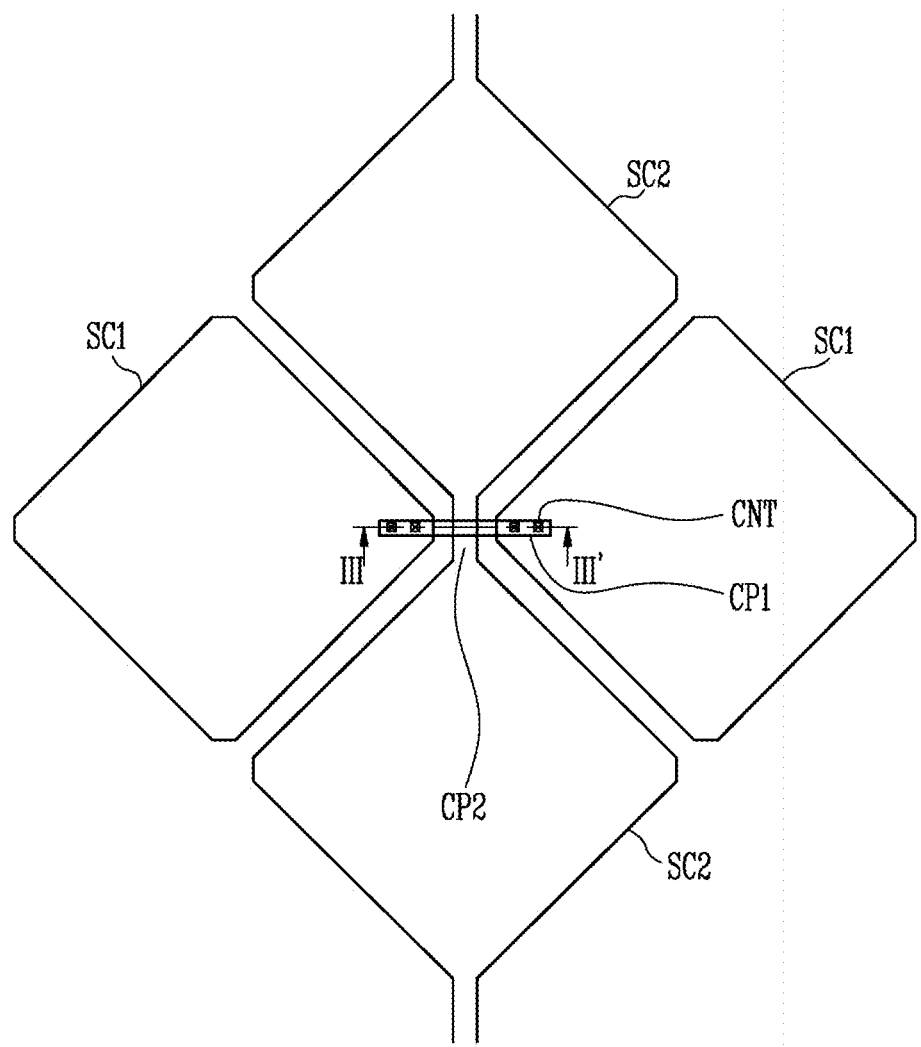
Figure 15:
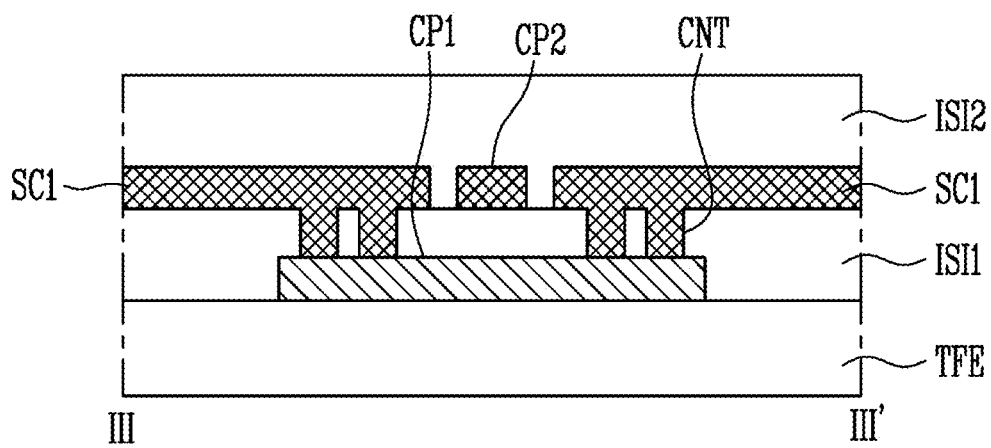

FIGS. 14 and 15 illustrate an embodiment of sensing electrodes and bridge electrodes. FIG. 15 illustrates a cross-sectional view taken along line III-III' of FIG. 14.

Bridge electrodes CP1 may be disposed on the encapsulation film TFE by patterning the first sensing electrode layer ISM1.

The first sensing insulating film ISI1 covers the bridge electrode CP1, and may include contact holes CNT exposing portions of the bridge electrodes CP1.

The first sensing electrodes SC1 and the second sensing electrodes SC2 may be formed on the first sensing insulating film ISI1 by patterning the second sensing electrode layer ISM2. The first sensing electrodes SC1 may be connected to the bridge electrode CP1 through the contact holes CNT.

The second sensing electrodes SC2 may have a connection pattern CP2 in the same layer by patterning the second sensing electrode layer ISM2. Accordingly, a separate bridge electrode may not be necessary to connect the second sensing electrodes SC2.

In some embodiments, each of the sensing electrodes SC1 and SC2 may cover a plurality of pixels PX. In this case, when each of the sensing electrodes SC1 and SC2 is formed of an opaque conductive film, a plurality of openings through which the plurality of pixels PX to be covered may be exposed may be included. For example, each of the sensing electrodes SC1 and SC2 may be configured in a mesh shape. When each of the sensing electrodes SC1 and SC2 is formed of a transparent conductive film, each of the sensing electrodes SC1 and SC2 may be formed in the form of a plate without an opening.

Figure 16:
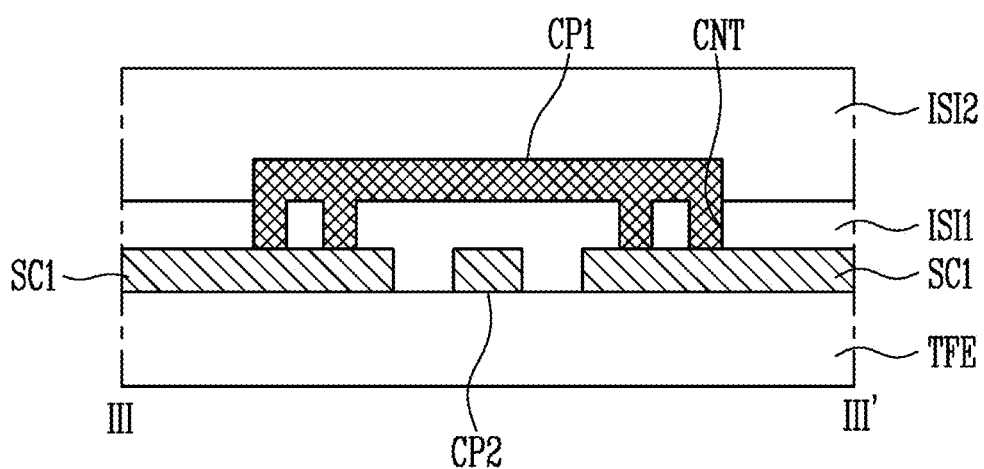

FIG. 16 illustrates sensing electrodes and bridge electrodes according to an embodiment of the present disclosure. FIG. 16 illustrates a cross-sectional view taken along line III-III' of FIG. 14.

The first sensing electrodes SC1 and the second sensing electrodes SC2 may be formed by patterning the first sensing electrode layer ISM1 to be disposed on the encapsulation film TFE.

The first sensing insulating film ISI1 may cover the first sensing electrodes SC1 and the second sensing electrodes SC2, and may include the contact holes CNT exposing portions of the first sensing electrodes SC1.

The bridge electrodes CP1 may be formed by patterning the second sensing electrode layer ISM2 to be disposed on the first sensing insulating film ISI1. The bridge electrodes CP1 may be connected to the first sensing electrodes SC1 through the contact holes CNT.

As is traditional in the field of the present disclosure, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, etc., which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions.

While the present disclosure has been particularly shown and described with reference to embodiments thereof, it will be understood by those of ordinary skill in the art that various changes in form and detail may be made therein without departing from the spirit and scope of the present disclosure as defined by the claims.

What is claimed is:

1. A display device, comprising:
 a touch sensor comprising a touch panel and a touch controller; and
 a crystal unit connected to the touch controller,
 wherein the touch controller comprises:
 a plurality of sensing channels connected to the touch panel; and
 a feedback circuit,
 wherein the crystal unit is connected to at least one of the sensing channels in a first mode, and is connected to the feedback circuit in a second mode.

2. The display device of claim 1, wherein the crystal unit comprises:
 a crystal oscillator disposed between a first terminal and a second terminal;
 a first external capacitor disposed between the first terminal and a ground power supply; and
 a second external capacitor disposed between the second terminal and the ground power supply.

3. The display device of claim 2, wherein in the first mode, the at least one sensing channel measures at least one of a capacitance of the first external capacitor and a capacitance of the second external capacitor.

4. The display device of claim 3, wherein the first terminal is connected to one of the sensing channels, and the one of the sensing channels measures the capacitance of the first external capacitor.

5. The display device of claim 3, wherein the second terminal is connected to one of the sensing channels, and the one of the sensing channels measures the capacitance of the second external capacitor.

6. The display device of claim 3, wherein the first terminal is connected to a first sensing channel among the sensing channels and the second terminal is connected to a second sensing channel different from the first sensing channel among the sensing channels, and the first sensing channel measures the capacitance of the first external capacitor and the second sensing channel measures the capacitance of the second external capacitor.

7. The display device of claim 3, wherein the touch controller further comprises an inspection unit that inspects whether the capacitance of the first external capacitor and the capacitance of the second external capacitor are normal values.

8. The display device of claim 7, wherein when the capacitance of the first external capacitor and the capacitance of the second external capacitor are the normal values, the first mode is switched to the second mode.

9. The display device of claim 8, wherein in the second mode, the feedback circuit outputs an oscillation frequency of the crystal oscillator.

10. The display device of claim 1, wherein each of the sensing channels comprising:
    an amplifier; and
    a feedback capacitor connected in parallel with the amplifier.

11. The display device of claim 1, wherein the feedback circuit comprises:
    an inverter; and
    a feedback resistor connected in parallel with the inverter.

12. The display device of claim 1, wherein the touch panel comprises a plurality of sensor electrodes that sense a touch input using a self-capacitive method.

13. A method of inspecting a display device that comprises a touch sensor comprising a touch panel and a touch controller and a crystal unit, the method comprising:
    connecting the crystal unit to at least one of a plurality of sensing channels of the touch controller;
    measuring an external capacitance of the crystal unit, and
    inspecting whether the external capacitance is a normal value that satisfies a predetermined condition corresponding to at least one of a load capacitance and a negative resistance of the crystal unit.

14. The method of claim 13, wherein the crystal unit comprises:
    a crystal oscillator disposed between a first terminal and a second terminal;
    a first external capacitor disposed between the first terminal and a ground power supply; and
    a second external capacitor disposed between the second terminal and the ground power supply.

15. The method of claim 14, wherein connecting the crystal unit to the at least one of the sensing channels comprises connecting the first terminal to the at least one of the sensing channels, and measuring the external capacitance of the crystal unit comprises measuring a capacitance of the first external capacitor.

16. The method of claim 14, wherein connecting the crystal unit to the at least one of the sensing channels comprises connecting the second terminal to the at least one of the sensing channels, and measuring the external capacitance of the crystal unit comprises measuring a capacitance of the second external capacitor.

17. The method of claim 14, wherein connecting the crystal unit to the at least one of the sensing channels comprises connecting the first terminal to a first sensing channel among the sensing channels and the second terminal to a second sensing channel different from the first sensing channel among the sensing channels, and measuring the external capacitance of the crystal unit comprises measuring a capacitance of the first external capacitor and a capacitance of the second external capacitor.

18. The method of claim 13, further comprising:
    connecting the crystal unit to a feedback circuit of the touch controller when the external capacitance is the normal value.

19. The method of claim 18, wherein the feedback circuit comprises:
    an inverter, and
    a feedback resistor connected in parallel with the inverter.

20. The method of claim 13, wherein each of the sensing channels comprises:
    an amplifier; and
    a feedback capacitor connected in parallel with the amplifier.

* * * * *